(12) United States Patent
Franke et al.

(10) Patent No.: US 10,963,942 B1
(45) Date of Patent: *Mar. 30, 2021

(54) SYSTEMS, METHODS, AND DEVICES FOR GENERATING RECOMMENDATIONS OF UNIQUE ITEMS

(71) Applicant: VAST.COM, INC., Austin, TX (US)

(72) Inventors: David Wayne Franke, Austin, TX (US); Joshua Howard Levy, Austin, TX (US); Hans Ulrich Grasemann, Austin, TX (US); Lauri Janet Moore, Austin, TX (US); David Pratt, Austin, TX (US); William T. Moose, Austin, TX (US); Andrew K. Moore, Austin, TX (US); John William Prior, Austin, TX (US)

(73) Assignee: VAST.COM, INC., Austin, TX (US)

( * ) Notice: Subject to any disclaimer, the term of this patent is extended or adjusted under 35 U.S.C. 154(b) by 17 days.

This patent is subject to a terminal disclaimer.

(21) Appl. No.: 16/153,129

(22) Filed: Oct. 5, 2018

Related U.S. Application Data

(62) Division of application No. 14/566,402, filed on Dec. 10, 2014, now Pat. No. 10,127,596.

(60) Provisional application No. 61/914,206, filed on Dec. 10, 2013, provisional application No. 61/955,467, filed on Mar. 19, 2014, provisional application No. 62/015,970, filed on Jun. 23, 2014, provisional application No. 62/022,567, filed on Jul. 9, 2014.

(51) Int. Cl.
*G06Q 30/06* (2012.01)

(52) U.S. Cl.
CPC ..... *G06Q 30/0631* (2013.01); *G06Q 30/0627* (2013.01); *G06Q 30/0641* (2013.01)

(58) Field of Classification Search
CPC ..... G06Q 30/0601–0643; G06Q 30/08; G06Q 30/06; G06Q 30/0241–0277
See application file for complete search history.

(56) References Cited

U.S. PATENT DOCUMENTS

| | | |
|---|---|---|
| 5,459,656 A | 10/1995 | Fields |
| 5,687,322 A | 11/1997 | Deaton et al. |
| 6,026,388 A | 2/2000 | Liddy et al. |
| 6,029,195 A | 2/2000 | Herz |
| 6,266,649 B1 | 7/2001 | Linden |
| 6,430,539 B1 | 8/2002 | Lazarus et al. |
| 6,510,406 B1 | 1/2003 | Marchisio |
| 6,539,392 B1 | 3/2003 | Rebane |
| 6,611,726 B1 | 8/2003 | Crosswhite |

(Continued)

OTHER PUBLICATIONS

U.S. Appl. No. 13/938,045, Franke et al.

(Continued)

*Primary Examiner* — William J Allen
(74) *Attorney, Agent, or Firm* — Knobbe, Martens, Olson & Bear, LLP

(57) ABSTRACT

The disclosure herein provides systems, methods, and devices for generating recommendations of dynamic or unique items. A system for generating recommendations of unique items comprises a data collection engine, a scoring engine, a user penalty calculator, and a recommendation compilation engine, wherein the recommendation engine is configured to transmit to a user access point system a list of recommended alternative unique items predicted to be preferred by a user of the user access point system.

12 Claims, 14 Drawing Sheets

(56) References Cited

U.S. PATENT DOCUMENTS

| | | |
|---|---|---|
| 6,711,581 B2 | 3/2004 | Rebane |
| 6,751,600 B1 | 6/2004 | Wolin |
| 6,751,614 B1 | 6/2004 | Rao |
| 6,775,664 B2 | 8/2004 | Lang et al. |
| 6,873,983 B2 | 3/2005 | Ugai et al. |
| 6,886,005 B2 | 4/2005 | Davis |
| 7,013,005 B2 | 3/2006 | Yacoub et al. |
| 7,069,258 B1 | 6/2006 | Bothwell |
| 7,165,119 B2 | 1/2007 | Fish |
| 7,167,871 B2 | 1/2007 | Farahat et al. |
| 7,206,780 B2 | 4/2007 | Slackman |
| 7,225,107 B2 | 5/2007 | Buxton et al. |
| 7,243,102 B1 | 7/2007 | Naam et al. |
| 7,260,568 B2 | 8/2007 | Zhang et al. |
| 7,283,951 B2 | 10/2007 | Marchisio et al. |
| 7,293,017 B2 | 11/2007 | Hurst-Hiller et al. |
| 7,356,430 B2 | 4/2008 | Miguelanez et al. |
| 7,395,170 B2 | 7/2008 | Scott et al. |
| 7,398,201 B2 | 7/2008 | Marchisio et al. |
| 7,433,885 B2 | 10/2008 | Jones |
| 7,440,955 B2 | 10/2008 | Khandelwal et al. |
| 7,444,308 B2 | 10/2008 | Guyon et al. |
| 7,467,232 B2 | 12/2008 | Fish et al. |
| 7,509,321 B2 | 3/2009 | Wong et al. |
| 7,523,047 B1 | 4/2009 | Neal et al. |
| 7,542,947 B2 | 6/2009 | Guyon et al. |
| 7,565,362 B2 | 7/2009 | Brill et al. |
| 7,593,904 B1 | 9/2009 | Kirshenbaum et al. |
| 7,593,934 B2 | 9/2009 | Li et al. |
| 7,596,552 B2 | 9/2009 | Levy et al. |
| 7,603,348 B2 | 10/2009 | He et al. |
| 7,631,008 B2 | 12/2009 | Carson et al. |
| 7,636,715 B2 | 12/2009 | Kalleh |
| 7,647,314 B2 | 1/2010 | Sun et al. |
| 7,657,493 B2 | 2/2010 | Meijer et al. |
| 7,660,581 B2 | 2/2010 | Ramer et al. |
| 7,664,746 B2 | 2/2010 | Majumder |
| 7,672,865 B2 | 3/2010 | Kumar et al. |
| 7,680,835 B2 | 3/2010 | MacLaurin et al. |
| 7,685,197 B2 | 3/2010 | Fain et al. |
| 7,693,818 B2 | 4/2010 | Majumder |
| 7,693,901 B2 | 4/2010 | Ka et al. |
| 7,716,202 B2 | 5/2010 | Slackman |
| 7,716,217 B2 | 5/2010 | Marston et al. |
| 7,716,225 B1 | 5/2010 | Dean et al. |
| 7,716,226 B2 | 5/2010 | Barney |
| 7,725,307 B2 | 5/2010 | Bennett |
| 7,725,451 B2 | 5/2010 | Jing et al. |
| 7,739,408 B2 | 6/2010 | Fish et al. |
| 7,761,447 B2 | 7/2010 | Brill et al. |
| 7,788,252 B2 | 8/2010 | Delli Santi et al. |
| 7,801,358 B2 | 9/2010 | Furmaniak et al. |
| 7,801,843 B2 | 9/2010 | Kumar et al. |
| 7,802,197 B2 | 9/2010 | Lew et al. |
| 7,805,331 B2 | 9/2010 | Demir et al. |
| 7,805,385 B2 | 9/2010 | Steck et al. |
| 7,805,438 B2 | 9/2010 | Liu et al. |
| 7,809,740 B2 | 10/2010 | Chung et al. |
| 7,818,186 B2 | 10/2010 | Bonissone et al. |
| 7,827,060 B2 | 11/2010 | Wright et al. |
| 7,827,170 B1 | 11/2010 | Horling et al. |
| 7,831,463 B2 | 11/2010 | Nagar |
| 7,836,057 B1 | 11/2010 | Micaelian et al. |
| 7,849,030 B2 | 12/2010 | Ellingsworth |
| 7,860,871 B2 | 12/2010 | Ramer et al. |
| 7,865,187 B2 | 1/2011 | Ramer et al. |
| 7,865,418 B2 | 1/2011 | Uenohara et al. |
| 7,870,017 B2 | 1/2011 | Kamath |
| 7,895,193 B2 | 2/2011 | Cucerzan et al. |
| 7,899,455 B2 | 3/2011 | Ramer et al. |
| 7,899,707 B1 | 3/2011 | Mesaros |
| 7,904,448 B2 | 3/2011 | Chung et al. |
| 7,908,238 B1 | 3/2011 | Nolet et al. |
| 7,912,458 B2 | 3/2011 | Ramer et al. |
| 7,912,713 B2 | 3/2011 | Vair et al. |
| 7,921,068 B2 | 4/2011 | Guyon et al. |
| 7,921,069 B2 | 4/2011 | Canny et al. |
| 7,930,197 B2 | 4/2011 | Ozzie et al. |
| 7,933,388 B1 | 4/2011 | Vanier et al. |
| 7,937,345 B2 | 5/2011 | Schmidtler et al. |
| 7,941,329 B2 | 5/2011 | Kenedy et al. |
| 7,958,067 B2 | 6/2011 | Schmidtler et al. |
| 7,966,219 B1 | 6/2011 | Singh et al. |
| 7,987,261 B2 | 7/2011 | Gamble |
| 8,001,121 B2 | 8/2011 | Wang et al. |
| 8,005,643 B2 | 8/2011 | Tunkelang et al. |
| 8,005,684 B1 | 8/2011 | Cheng et al. |
| 8,005,774 B2 | 8/2011 | Chapelle |
| 8,005,826 B1 | 8/2011 | Sahami et al. |
| 8,015,065 B2 | 9/2011 | Davies |
| 8,024,327 B2 | 9/2011 | Tunkelang et al. |
| 8,024,349 B1 | 9/2011 | Shao et al. |
| 8,027,864 B2 | 9/2011 | Gilbert |
| 8,027,865 B2 | 9/2011 | Gilbert |
| 8,032,405 B2 | 10/2011 | Gilbert |
| 8,051,033 B2 | 11/2011 | Kenedy et al. |
| 8,051,073 B2 | 11/2011 | Tunkelang et al. |
| 8,065,184 B2 | 11/2011 | Wright et al. |
| 8,065,254 B1 | 11/2011 | Das et al. |
| 8,069,055 B2 | 11/2011 | Keen |
| 8,078,606 B2 | 12/2011 | Slackman |
| 8,095,523 B2 | 1/2012 | Brave et al. |
| 8,099,376 B2 | 1/2012 | Serrano-Morales et al. |
| 8,126,881 B1 | 2/2012 | Sethi et al. |
| 8,326,845 B2 | 12/2012 | Sethi et al. |
| 8,375,037 B2 | 2/2013 | Sethi et al. |
| 8,600,823 B1 | 12/2013 | Raines et al. |
| 8,620,717 B1 | 12/2013 | Micaelian et al. |
| 8,645,844 B1 | 2/2014 | Strobel et al. |
| 8,868,572 B2 | 10/2014 | Sethi et al. |
| 8,954,424 B2 | 2/2015 | Gupta et al. |
| 9,104,718 B1 | 8/2015 | Levy et al. |
| 9,324,104 B1 | 4/2016 | Levy et al. |
| 9,465,873 B1 | 10/2016 | Franke et al. |
| 9,690,857 B1 | 6/2017 | Franke et al. |
| 9,710,843 B2 | 7/2017 | Levy et al. |
| 9,799,000 B2 | 10/2017 | Sethi et al. |
| 9,830,635 B1 | 11/2017 | Levy et al. |
| 10,007,946 B1 | 6/2018 | Levy et al. |
| 10,109,001 B1 | 10/2018 | Levy et al. |
| 10,115,074 B1 | 10/2018 | Sethi et al. |
| 10,127,596 B1 | 11/2018 | Franke et al. |
| 10,268,704 B1 | 4/2019 | Sanderson et al. |
| 10,572,555 B1 | 2/2020 | Franke et al. |
| 10,643,265 B2 | 5/2020 | Levy et al. |
| 2002/0035520 A1 | 3/2002 | Weiss |
| 2002/0077931 A1 | 6/2002 | Henrion et al. |
| 2003/0004745 A1 | 1/2003 | Takakura |
| 2003/0014402 A1 | 1/2003 | Sealand et al. |
| 2003/0088457 A1 | 5/2003 | Keil et al. |
| 2003/0089218 A1 | 5/2003 | Gang et al. |
| 2003/0225644 A1 | 12/2003 | Casati et al. |
| 2003/0229552 A1 | 12/2003 | Lebaric et al. |
| 2005/0027670 A1 | 2/2005 | Petropoulos |
| 2005/0086070 A1 | 4/2005 | Engelman |
| 2005/0154717 A1 | 7/2005 | Watson et al. |
| 2006/0026081 A1 | 2/2006 | Keil et al. |
| 2006/0041465 A1 | 2/2006 | Woehler |
| 2006/0248035 A1 | 11/2006 | Gendler |
| 2007/0027741 A1 | 2/2007 | Gruhl et al. |
| 2007/0060114 A1 | 3/2007 | Ramer et al. |
| 2007/0060129 A1 | 3/2007 | Ramer et al. |
| 2007/0143184 A1 | 6/2007 | Szmanda |
| 2007/0156514 A1 | 7/2007 | Wright et al. |
| 2007/0156887 A1 | 7/2007 | Wright et al. |
| 2007/0239373 A1 | 10/2007 | Nasle |
| 2008/0065425 A1 | 3/2008 | Giuffre et al. |
| 2008/0162574 A1 | 7/2008 | Gilbert |
| 2008/0222010 A1 | 9/2008 | Hudak et al. |
| 2009/0006118 A1 | 1/2009 | Pollak |
| 2009/0112927 A1 | 4/2009 | Chitnis et al. |
| 2011/0055207 A1 | 3/2011 | Schorzman et al. |
| 2012/0005045 A1 | 1/2012 | Baker |
| 2012/0047158 A1 | 2/2012 | Lee et al. |

(56) References Cited

U.S. PATENT DOCUMENTS

| | | |
|---|---|---|
| 2013/0030870 A1 | 1/2013 | Swinson et al. |
| 2013/0159057 A1 | 6/2013 | Hsiao |
| 2013/0179252 A1 | 7/2013 | Dong et al. |
| 2013/0246300 A1 | 9/2013 | Fischer |
| 2014/0032572 A1 | 1/2014 | Eustice et al. |
| 2014/0046804 A1* | 2/2014 | Nadjarian .......... G06Q 30/0625 705/26.62 |
| 2014/0100989 A1 | 4/2014 | Zhang |
| 2014/0257934 A1 | 9/2014 | Chrzan et al. |
| 2014/0258042 A1 | 9/2014 | Butler et al. |
| 2014/0258044 A1 | 9/2014 | Chrzan et al. |
| 2014/0279195 A1 | 9/2014 | Kubicki et al. |
| 2015/0100420 A1 | 4/2015 | Van Horn et al. |
| 2015/0324737 A1 | 11/2015 | Chrzan et al. |
| 2015/0324879 A1 | 11/2015 | Lu et al. |
| 2017/0372402 A1 | 12/2017 | Levy et al. |

OTHER PUBLICATIONS

U.S. Appl. No. 15/981,750, Levy et al.

Persaud et al., "Innovative mobile marketing via smartphones: Are consumers ready?", Article in Marketing Intelligence & Planning, Jun. 2012.

* cited by examiner

SYSTEMS, METHODS, AND DEVICES FOR GENERATING RECOMMENDATIONS OF UNIQUE ITEMS

CROSS REFERENCE TO RELATED APPLICATIONS

This application is a division of U.S. patent application Ser. No. 14/566,402, titled SYSTEMS, METHODS, AND DEVICES FOR GENERATING RECOMMENDATIONS OF UNIQUE ITEMS, filed on Dec. 10, 2014, which claims the benefit of U.S. Provisional Application No. 61/914,206, titled SYSTEMS, METHODS, AND DEVICES FOR GENERATING RECOMMENDATIONS OF DYNAMIC SYSTEMS, filed on Dec. 10, 2013, U.S. Provisional Application No. 61/955,467, titled SYSTEMS, METHODS, AND DEVICES FOR DETERMINING AND PRESENTING USER-SPECIFIC ATTRIBUTES OF UNIQUE ITEMS, filed on Mar. 19, 2014, U.S. Provisional Application No. 62/015,970, titled SYSTEMS, METHODS, AND DEVICES FOR DETERMINING AND PRESENTING USER-SPECIFIC SIGNIFICANT ATTRIBUTES OF UNIQUE ITEMS, filed on Jun. 23, 2014, and U.S. Provisional Application No. 62/022,567, titled SYSTEMS, METHODS, AND DEVICES FOR MEASURING SIMILARITY OF AND GENERATING RECOMMENDATIONS FOR UNIQUE ITEMS, filed on Jul. 9, 2014. Each of the above listed applications is hereby incorporated by reference herein in its entirety.

BACKGROUND

Field

The disclosure relates generally to the field of comparing dynamic or unique items, and more specifically to systems, methods, and devices for comparing and generating recommendations for dynamic or unique items.

Description

Collaborative filtering systems can be used to recommend items to a user based on a user's previously expressed preferences. In general, a collaborative filter collects information about the preferences of many users and uses that information to predict the preferences of individual users. For example, if a user streams videos from a streaming video service, the service may utilize a collaborative filter to generate recommendations of alternate videos to stream based on an estimated likelihood that the user will be interested in the alternate videos. In another example, a user may purchase books from a bookseller, and the bookseller may utilize a collaborative filter to make recommendations to the user of alternate books based on an estimated likelihood that the user will be interested in the alternate books.

Collaborative filtering has limitations in its effectiveness, particularly when the relevant products or services are unique. Typically, a collaborative filter will assume that all similar items are identical. For example, when a user streams a particular movie, the collaborative filter assumes that all users who stream that movie view the same content, which is typically a valid assumption for a video streaming service. In another example, a collaborative filter that makes recommendations of books will typically assume that all customers that purchase a particular book are buying identical content. Accordingly, it can be advantageous to have systems, devices, and/or methods for measuring similarity of and generating recommendations for unique items.

SUMMARY

The disclosure herein provides methods, systems, and devices for measuring similarities of and generating recommendations for unique items, customizable items, and/or items having varying conditions, such as used vehicles and homes.

In some embodiments, a system for generating recommendation of unique items, the system comprises: a data collection engine configured to monitor a plurality of user devices to identify an item selected by a user, wherein the selected item comprises a unique item presented by an electronic listing system configured to present unique items, each unique item comprising a plurality of features; a scoring engine configured to determine data relating to the plurality of features of the selected item and generate a similarity score for each of a plurality of alternative unique items, wherein the similarity score indicates a predicted similarity of the alternative unique items and the selected item based on the similarity of the features of the alternative unique items to the plurality of features of the selected item; a user penalty calculator configured to generate a user specific score for each of the plurality of alternative unique items indicating a predicted level of preference by the user, wherein the user specific score is generated by applying a scoring model, the scoring model generated at least in part by analyzing historical preference information of the user; a recommendation compilation engine configured to determine a list of recommended alternative unique items based on the similarity score and the user specific score for the alternative unique items; and wherein the recommendation compilation engine is configured to transmit to the user in real time the list of recommended alternative unique items that are predicted to be preferred by the user, wherein the list comprises at least a portion of the plurality of alternative unique items sorted by their respective recommendation scores.

In certain embodiments, a parameter recommendation system for recommending user specific search parameters comprises: a search engine configured to receive a plurality of search parameters from a user and apply the search parameters to the plurality of items in an electronic listing system to determine an original subset of the plurality of items based on the search parameters, wherein the plurality of items in the electronic listing system comprises a plurality of features; a parameter modification engine configured generate a plurality of potential modifications to a candidate parameter; a search update module configured to generate a plurality of new subsets of items in the electronic listing system, wherein each of the plurality of new subsets corresponds to one of the plurality of potential modifications to the candidate parameter and comprises items that match the plurality of search parameters with the corresponding modification to the candidate parameter are not in the original subset of the plurality of items; a parameter modification scoring module configured to generate a modification score for each of the plurality of potential modifications to the candidate parameter, wherein the modification score is based on the similarity score for each item in the corresponding new subset of items generated for each of the plurality of potential modifications to the candidate parameter; a parameter recommendation engine configured to transmit a recommended modification to the to the user based on the modification scores of each of the plurality of modifications to the candidate search parameter; wherein the search engine is configured to receive an indication that the user accepts the recommended parameter modification and update the search results based on the accepted recommended parameter modification.

In certain embodiments, a computer-implemented method for generating recommendations of unique items comprises: identifying, by a computer system, an item selected by a user, wherein the selected item comprises a unique item presented by at least one electronic listing system, the unique item comprising a plurality of features; determining, by the computer system, information relating to the plurality of features of the selected item; inputting, by the computer system, the information relating to the plurality of features of the selected item into a scoring engine; generating, by the scoring engine, a recommendation score for each of a plurality of alternative unique items, wherein the recommendation score indicates a predicted level of preference by the user; wherein generating the recommendation score comprises applying, by the scoring engine, a scoring model, the scoring model generated at least in part by analyzing historical preference information; and generating, by the computer system, a list of recommended alternative unique items that are predicted to be preferred by the user, wherein the list comprises at least a portion of the plurality of alternative unique items sorted by their respective recommendation scores; wherein the computer system comprises a computer processor and electronic memory.

For purposes of this summary, certain aspects, advantages, and novel features of the invention are described herein. It is to be understood that not necessarily all such advantages may be achieved in accordance with any particular embodiment of the invention. Thus, for example, those skilled in the art will recognize that the invention may be embodied or carried out in a manner that achieves one advantage or group of advantages as taught herein without necessarily achieving other advantages as may be taught or suggested herein.

BRIEF DESCRIPTION OF THE DRAWINGS

The foregoing and other features, aspects, and advantages of the present invention are described in detail below with reference to the drawings of various embodiments, which are intended to illustrate and not to limit the invention. The drawings comprise the following figures in which.

DETAILED DESCRIPTION OF THE EMBODIMENTS

Overview

The disclosure herein provides systems, methods, and devices for comparing dynamic or unique items and generating recommendations of alternative items based on a user's expressed and derived preferences. Such a system may be utilized with items that are unique, have varying conditions, are customized, degrade over time, and/or the like, such as used vehicles, existing homes, household goods, and/or the like. In one embodiment, a recommendation system is configured to receive a selection from a user or user access point system of an item the user is interested in and/or one or more search criteria. For example, a user may select a home listing on a website or other application listing homes for sale. The home that is the subject of the listing may comprise a plurality of features or characteristics, such as a number of bedrooms, a square footage, a lot size, a proximity to schools, and/or the like. The user may also submit one or more search criteria such as price, bedrooms, bathrooms, locations, or other features. The system may also be configured to provide the user with recommended updates to search criteria, where the updated criteria provide the user with additional and/or better results.

Figure 1:
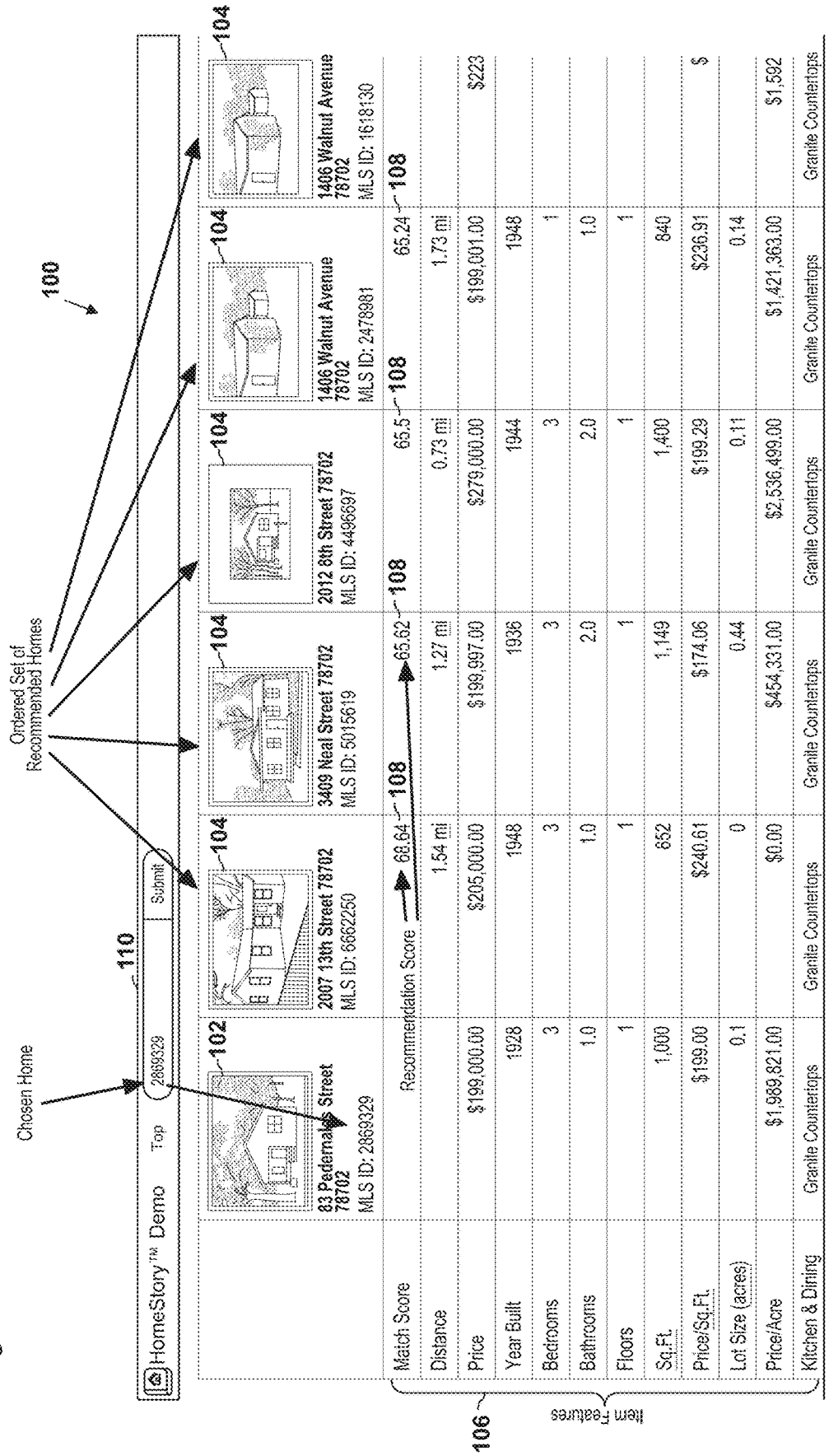
FIG. 1 depicts an embodiment of a user interface of a user access point system in communication with or as part of a recommendation system.

The recommendation system may be configured to retrieve details of various alternative listings, including the alternative listings' features or characteristics, and to determine differences in the features or characteristics between each of the alternative listings and the selected listing. The system may be configured to then apply a scoring model to each alternative item to generate a recommendation score for each alternative item. For example, a relatively high recommendation score may indicate a prediction that the user would be interested in that alternative listing. On the other hand, a relatively low recommendation score may indicate a prediction that the user would not be interested in that alternative listing. The recommendation system can be configured to sort the alternative items by the recommendation score, for example, by sorting them in descending order. The recommendation system can then provide the sorted alternative listings to the user as a group or list of alternative listings the recommendation system predicts the user may be interested in reviewing in addition to the selected item. FIG. 1, as further described below, illustrates one example of a recommendation as presented by a recommendation system. FIG. 1 illustrates a selected item 102 on the left and various alternative items 104 in columns next to the selected item.

In some embodiments, a recommendation system may be configured to generate a recommendation score based on the similarity of the alternative items to the selected properties. For example the recommendation system may calculate a dissimilarity penalty between the selected item and the alternative items based on the distance between the attributes of the respective properties. For example, the dissimilarity penalty may depend on the difference in the number of rooms between a selected listing and an alternative listing, or the difference in price between a selected listing and an alternative listing.

In some embodiments a recommendation system may be further configured to tailor the recommendation score to specific users. For example, the recommendation system may be configured to track, monitor, and/or analyze user interactions with one or more electronic item listing systems to develop scoring models for utilization in generating recommendation scores. Based on the preference history for a user, the recommendation system may generate a scoring model for the user which values some attributes more than others. For example, a recommendation system may be configured to aggregate data in substantially real time from multiple websites that offer houses, used vehicles, and/or the like for sale to customers. In some embodiments, the system may also be configured to derive one or more user preferences based on additional information known about the client, such as information received from a client survey, information about the demographics of the client, and/or the like. For example, if the system recognizes that a client has children, the system may value attributes such as proximity to schools, recreation activities or the like higher than attributes such as local nightlife.

In some embodiments, the system can be configured to generate pairs of individual listings that the same user viewed and to determine whether the user liked (or otherwise expressed a preference for) both listings, liked one listing but not the other, and/or did not like either listing. The system can be configured to analyze these preferences of the user along with feature differences of the listings to determine how differences in features of various listings may affect a predicted preference for alternative items. For example, in addition to the similarity of the alternative item to the selected item, the system may determine that the likelihood a user will prefer an alternative listing based on the historical preference data of that user. The system can be configured to generate scoring models for a particular user using, for example, regression and/or supervised learning algorithms, such as linear regression, random forests, or pairwise comparison methods.

Scoring models generated for a specific user may be stored in a scoring model database to be retrieved when a user selects a new item or searches for new items. In some embodiments, a recommendation system may be further configured to generate a demographic scoring model that further refines the recommendation score based on demographic data about the user. For example, the recommendation system may adjust the scoring model for a user with children to value school district attributes when recommending alternative property listings. The recommendation system may use a combination of similarity scores and user specific scores based on user data and preference history to generate a recommendation score for each alternative item.

The terms "dynamic" and "unique," as used herein, are used generally interchangeably and are generally used to refer to items having varying conditions, customizations, ages, configurations, and/or the like, and items that may decay over time, change condition over time, etc. Examples of such items include, but are not limited to, homes, commercial real estate, used vehicles, household goods, collectibles, automotive components, and the like.

Although several embodiments, examples, and illustrations are disclosed below, it will be understood by those of ordinary skill in the art that the invention described herein extends beyond the specifically disclosed embodiments, examples, and illustrations and includes other uses of the invention and obvious modifications and equivalents thereof. Embodiments of the invention are described with reference to the accompanying figures, wherein like numerals refer to like elements throughout. The terminology used in the description presented herein is not intended to be interpreted in any limited or restrictive manner simply because it is being used in conjunction with a detailed description of certain specific embodiments of the invention. In addition, embodiments of the invention can comprise several novel features and no single feature is solely responsible for its desirable attributes or is essential to practicing the inventions herein described.

The systems, methods, and devices disclosed herein have various advantages over other recommendation options, such as collaborative filtering. Collaborative filters may be used, for example, to generate recommendations based on past items a user has expressed an interest in. One downside to collaborative filtering is it often requires knowing something about the user to which the system is providing a recommendation. For example, a collaborative filter may require knowing at least some information about that user's past actions. On the other hand, using systems as described herein, a system can be configured to predict the preferences of a user based merely on that user's expressed interest in a single item. In some embodiments, the system may be configured to take into account additional factors, such as known user preferences and/or additional items a user may be interested in, but these additional factors are not required for some embodiments of the systems, methods, and devices described herein.

Further, a collaborative filter may require an item to be viewed by a relatively large number of users before the filter can generate reasonably usable recommendations for that item. Systems as described herein, however, as further described below, can be configured to generalize to previously unseen items, to enable accurate recommendations of items may not have even been viewed by a single user yet. This is advantageous particularly in systems relating to dynamic items, such as used vehicles and homes, because a specific item may not be present on a listing system for an extended period of time. Therefore, it is important to be able to generate useful recommendations for newly-listed items that have not yet been viewed by or otherwise interacted with by users.

Recommendation techniques such as collaborative filters are often configured to consider the set of products or items for which users have expressed interest in and to then generate a set of candidate products that might also be interesting to a particular user. However, in systems utilizing collaborative filters, the system typically assumes that products or items are identical copies of each other. For example, when a user is choosing a movie using a movie streaming service, the system may assume that each viewing of the movie will be identical to the last. Additionally, when a user is presented with book options by a book selling service, every copy of an individual book may be assumed to be identical to the last. With dynamic or unique items, however, such as existing homes and used vehicles, each item has differences from other items and is unique in itself. For example, different houses may have different ages, may be located at different locations, may have different features or conditions, etc. Different used vehicles may have a different number of miles, different customization features, differing amounts of wear and tear, etc. Embodiments of systems as described herein are configured to take into account these differences inherent in dynamic or unique items.

In systems utilizing collaborative filtering, the turnover rate of the available set of items is often assumed to change relatively slowly over time, as the number of items added or removed may be relatively small compared to the overall number of items remaining in the set for sale. Furthermore, the physical location of an item may not be considered in a collaborative filtering algorithm, nor may be the item's decay or change in condition over time. For these reasons and others as described herein, standard collaborative filtering algorithms are not suitable for situations in which items change frequently or represent dynamic or unique items, or for experiences that are not copies of each other, due to differences in design, construction, condition or location, and/or the like, such as with used cars or existing homes.

Another advantage of systems and methods described herein with respect to collaborative filtering is that collaborative filters are not able to generalize to previously unseen items. For example, if a new book is added to a book seller's inventory, a collaborative filtering algorithm may not be able to determine what users that book should be recommended to without first analyzing the preference patterns of users that have actually interacted with listings of the new book. On the other hand, systems, methods, and devices as described herein can be configured to analyze a new item added to a seller's inventory and to predict substantially in real time the preference users may have for that item as compared to other items prior to a single user even viewing the new listing. For example, when a new existing home is listed in a home listing service, a system as described herein may be configured to immediately be able to analyze the differences in features, characteristics, market conditions, etc. of that listing versus a selected listing a user has expressed a preference in and to determine the predicted preference that user may have for this new listing.

Potential alternatives to collaborative filtering techniques are unsupervised learning techniques. Unsupervised learning can be used to model user preference by attempting to cluster and/or group previous items together by patterns of historical co-occurrence. Distance metrics based upon differences in item features may be used to determine how "far away" one item is from another item. Given a previous item, unsupervised learning techniques may be able to produce a list of "nearby" items that both commonly co-occurred with the previous item and had few or small differences with respect to the previous item. However, unsupervised learning techniques cannot recommend nearby items based upon their predicted preferentiality, since these techniques do not map the differences of item features to item outcomes, such as liked/didn't like, favorited/didn't favorite, etc., and so have no direct method to distinguish between nearby preferred and disliked items. Unsupervised learning techniques therefore produce items without direct regard for the desirability of those items.

The systems, methods, and devices disclosed herein address the shortcomings of collaborative filtering and unsupervised learning techniques by, in part, addressing the problem of producing preferred recommendations in situations of high item turnover rates and/or item uniqueness, such as due to changes or differences in condition, location, customization, and/or various other factors. Utilizing models constructed by supervised machine learning algorithms and/or similar techniques, such as linear regression, random forests, etc., systems as described herein can be configured to compute predictions of user preferences for particular items, even if the system has never seen those particular items before. In some embodiments, the models are trained using explicit historical input/output pairs, including as inputs descriptions of the features of the items, as well as differences in the features between the items, with outputs being one or more scoring models comprising paired historical records of preference.

Unlike collaborative filtering, which attempts to predict an absolute measure of preference for each particular item when judged alone by a particular user, the methods described herein can be configured to predict the preference of one item relative to alternative items, regardless of user. In some embodiments, a global preference ordering of all items in an inventory can be constructed for a user from just a single recorded preference of any item. For example, a system can be configured to accept an item selection from a user, such as by enabling the user to click on a listing for an item on an internet listing service. The system can then be configured to order all items in the inventory by a predicted preference for those items based on the selected item. Accordingly, the systems and methods as described herein may be applicable not only in domains that collaborative filtering is applicable, where it is assumed that every time a user chooses a particular item an experience identical to the last is generated, but also in other domains where no two items are identical, due to differences that can be perceived or experienced in the delivery of that item, whether through its customization, condition degradation, location changes, time of use changes, and/or the like.

Another benefit of systems, methods, and devices as described herein is that the methods implemented in some embodiments use machine learning techniques to explicitly model the effect of changes in item features, such as a different number of bedrooms in a home, upon user preference, such as liked/didn't like. This technique may be more effective than techniques commonly used in some domains, such as real estate, that make recommendations based upon ad hoc heuristics such as "recommend homes that have the same number of bedrooms as a preferred home, plus or minus one."

To enable the prediction of preferences for alternative items based on a selected item, the systems, methods, and devices described herein in some embodiments implement one or more scoring models. In some embodiments, the system can also be configured to calculate a similarity score that determines how similar one unique item is to another unique item. This score can then be used to, for example, enable displaying of similar properties to a property a user is interested in. For example, the system can be configured to display a list of recently sold and still available similar properties. In some embodiments, the system can be configured to calculate similarity scores using techniques similar to as described in U.S. patent application Ser. No. 13/927,513, entitled SYSTEMS, METHODS, AND DEVICES FOR MEASURING SIMILARITY OF AND GENERATING RECOMMENDATIONS FOR UNIQUE ITEMS, filed on Jun. 26, 2013, the entirety of which is hereby incorporated by reference herein. For example, the similarity score may be generated at least in part by determining the distance between attributes of a selected item and an alternative item.

In some embodiments, in addition to merely calculating a similarity of alternate unique items to a specific selected unique item, the system can be configured to factor in a user's specific preferences, history, and/or the like in determining which similar items to display to the user. For example, the system may be configured to analyze a client's history, preferences, browsing history, demographics, and/or the like to determine what attributes are most significant to that user. The system can then be configured to take that information into account in determining which similar items to display to that user. For example, a specific user may place more weight on the number of bedrooms than an average user. Accordingly, the system may be configured to rank higher in the similarity score calculation properties that have a number of bedrooms matching that user's preference than the system ordinarily would if not taking into account that user's specific preferences.

In some embodiments, a user specific scoring model can be generated based on an analysis of historical preferences of pairs of items viewed or otherwise interacted with by the same user. For example, when faced with a situation in which a user did not like a chosen item A, but liked a chosen item C, a relevant question to ask may be "which differences between A and C caused the user to like C, but not A?" In some embodiments, in order to answer questions such as this, a system can be configured to examine records of past user behavior, create pairs of item choices experienced by the same user, and label those pairs with the preferentiality of the second item in the pair. For example the pairs may be labeled liked/didn't like or favorited/didn't favorite, etc. For example, if a user chose items A, B, and C in the past, but only liked item C, then a system as described herein in some embodiments may be configured to create all possible non-repeating pairings, such as AB, AC, BA, BC, CA, and CB. Since the user only liked item C, the pairs ending in C would be labeled as preferred and the other pairs would be labeled as not preferred. In some embodiments, by labeling item pairs with the preferentiality of the second item, preference changes can be modeled in the context of the first item, instead of in a global context of all possible items. In some embodiments, this enables relatively specific patterns of preference to be extracted and modeled, such as "preference decreases 17% when price increases more than 41%," or "preference decreases exponentially when price increases, with parameters k=0.5 and C=1." In some embodiments, scoring models generated in accordance with these concepts and other concepts as described herein can enable a system to predict a user's preference for an alternative item without having analyzed that particular alternative item as part of the model building process. This can be advantageous, particularly in a market having relatively high turnover of unique items, to enable a system to provide recommendations of alternative items not previously seen or analyzed by the recommendation system.

Although in the previous example, the labeling of paired historical alternatives used two-valued labels, such as liked/didn't like, the labeling of paired historical alternatives is not limited to two-valued labels. For example, ordinal or continuous labels, such as score or rating differences between two paired items, could be used. In one embodiment, for example, if a user awarded a 5 star rating to movie A but only a 3.7 star rating to movie B, the pair AB may be labeled with the preferential difference (3.7-5.0=negative 1.3) when switching from movie A to B. In some embodiments, the system can be configured to generate a model that is trained to map similar pairs of movies to the same preferential difference.

When generating scoring models and/or generating recommendation scores, in some embodiments, any feature difference that can be encoded for use with a supervised training algorithm can be used as an input. For example, differences in condition (for example, mileage, age of construction, etc.) as well as various other differences, such as a difference in location (for example, a distance in kilometers, a commute time to downtown, etc.) may be easily used as inputs to a supervised learning algorithm, which may enable the effect of these differences in features on preference to be directly modeled and studied. Creating direct mappings from paired historical alternatives to historical preference in some embodiments enables this ability to use any feature difference. In some embodiments, in addition to feature differences, features themselves can also be used directly as inputs (for example, a number of bedrooms).

Another advantage of systems, methods, and devices as disclosed herein, is that, since the systems in some embodiments utilize the features of each item as inputs to generate scoring models, there is no need to divide items into groups. In other recommendation systems, items may need to be divided into groups such as houses, books, cars, geographic location, and/or the like. However, with embodiments of systems as described herein, these groupings are not necessary. For example, there is no need to put instances of all "two bedroom homes" into a group and to determine user preference for that group versus instances in other groups. In embodiments of systems as described herein, each individual item (for example, a home, a car, a viewing of a movie, etc.) is a unique item in both time and space, and therefore there is no need to group these items by category, type, geographic location, etc. Preference change with distance from interesting locations may be modeled just as is any other feature. Note, however, that even though labeling items as being members of various groups is not required, the labeling of items as part of a particular group may be used in some embodiments to, for example, increase accuracy and/or enhance the user experience. For example, a system may be configured to label all four-door cars as being part of a sedan group and label all two-door cars as being part of a coupe group. In some embodiments, every group that an item belongs to may be defined as simply an additional feature of that item.

As discussed above, systems, methods, and devices as disclosed herein do not require that individual unique items be given an assignment to one or more categories. In addition, systems, methods, and devices as disclosed herein may be configured to not require that a user configure any filters or provide anything other than simply an expressed preference for a single item. Upon receiving that expressed preference for the single item, a system as described herein can be configured to compute preference predictions for all other items against that single selected item. In some embodiments, there is no need for users to explicitly state filters or search parameters, such as "only two bedroom homes with a listing price between $150,000 and $200,000." Note, however, that such search parameters and/or filters may be included in systems as described herein to increase accuracy of recommendations and/or to enhance the user experience.

In some embodiments, a recommendation system for generating and presenting recommendations of dynamic or unique items directly maps from paired historical alternatives to a predicted preference. The predicted preference in some embodiments may be based on differences in features between a selected item and alternative items. Examples of feature differences that may be used to generate a prediction of preference include, but are not limited to, a distance one item is located from another item, a price difference between items, the years each item was built, a number of bedrooms, a number of bathrooms, a number of floors, an amount of square footage, a price per square foot, a lot size, a price per acre, and/or various other features.

In some embodiments, such as shown in FIG. 1, a recommendation system can be configured to generate a recommendation score for alternative real estate listings based on a selected listing. The alternative listings can be sorted by this recommendation score to present an ordered set of recommendations that the system predicts a user will also be interested in based on the selected item. In some embodiments, the recommendation scores are generated by a scoring model produced using one or more regression and/or supervised learning algorithms, such as linear regression or random forests, trained on a historical set of preferences that map encountered instances of features of and feature differences between subject and target listings to outputs of, for example, favorited or didn't favorite.

In some embodiments, the historical set of preferences can be collected by analyzing user activity on, for example, one or more real estate websites on which users can view and/or favorite real estate listings. In one embodiment, the system can be configured to consider listings that were viewed but not favorited as being "didn't favorite." The system can be configured to construct pairs of listings viewed using all of the collected listings viewed by each user. The pairs can then be labeled favorited or didn't favorite, depending on the user's favoriting action, or lack thereof, on the second listing in the two listing pair. Note that, although embodiments as described herein base the label on the second listing of the two listing pair, other embodiments may base the label on the first listing of the two listing pair. Additionally, other embodiments may utilize more than two listings, such as three listings, four listings, five listings, etc. Various algorithms, such as a random forest algorithm, may be used to construct a scoring model that can be used to predict the favoriting action of a user based upon a pair of listings. In some embodiments, inputs to the scoring model comprise the features of each listing, such as price and number of bedrooms, as well as feature differences between the two listings, such as a percentage price difference between the two listings in the pair.

In addition to historical preferences, the disclosed systems may generate a model based on other user characteristics. For example, a second scoring model may be generated to be used in combination with the model based on preference history or the preference history model may be adjusted to take into account other user information. Other user information may include survey data provided by the user, demographic data about the user, and/or other information. For example, if the user lives in New York City as determined by demographic data or is looking to move to New York City as received in user survey data, then the system may create a second scoring model which determines that parking is likely to be important to the user. In some embodiments, the system has a set of prototype users or user templates which generate user specific scoring models.

Figure 8:
FIG. 8 depicts an embodiment of a user interface of a user access point system in an embodiment of a recommendation system configured to provide significant attributes of unique items.

In some embodiments of the systems disclosed, the system may be configured to determine and provide significant attributes about the unique items. For example, FIG. 8 illustrates one example of significant attributes of a selected real estate property presented to a user through a user access point system. This may include information about various attributes or significant attributes of properties as determined by the system. For example, the system can be configured to analyze various homes on the market, past sales history, and/or user interactions with listings of those items to determine what features are most important. In some embodiments, the system can be configured to determine what attributes are significant using, for example, the techniques disclosed in U.S. patent application Ser. No. 13/924, 375, entitled SYSTEMS, METHODS, AND DEVICES FOR IDENTIFYING AND PRESENTING IDENTIFICATIONS OF SIGNIFICANT ATTRIBUTES OF UNIQUE ITEMS, filed on Jun. 21, 2013, the entirety of which is hereby incorporated by reference herein.

The system can further be configured to tailor which attributes are displayed to a particular user. For example, the system can be configured to determine both which attributes of properties are significant in general, and what attributes would be more important to a specific user or client. In some embodiments, the system can be configured to analyze preferences of a client, such as preferences provided by the client and/or agent. In some embodiments, the system can also be configured to analyze this along with other information the significant attributes system has determined about the client to determine which attributes would be most significant to that specific user. The system can then be configured to display to the user the most significant attributes that that user would be interested in. As can be seen in FIG. 8, this example of a property detail page displays in the top left corner of a display of six different attributes the attribute that this property is 5% more expensive than similar properties. In this example, the system may have determined that this would likely be the most significant attribute in which the specific client or user would be most interested. In some embodiments, user specific significant attributes of a property may be derived from a user specific scoring model used to generate a user specific score for recommending items. For example, the user specific scoring model may comprise a weighted vector to be applied to the attributes of alternative items. The weights of the vectors may be used to determine which attributes are most likely to be significant to the specific user.

In some embodiments, the system can be configured to provide recommendations and/or determine what attributes may be significant to a particular user based on demographic information. For example, the system can be configured to analyze what is important to other people like this specific user, and to infer that this specific user would have similar interests. In some embodiments, the system can be configured to gather information about a specific user from a variety of sources in order to help determine what this specific user is like and what attributes may be important to that user. By tailoring the display of attributes that are most important to a specific user, in some embodiments, every piece of information displayed can be specifically chosen to increase the odds of a sale or conversion.

As an example of tailoring attributes to specific users, a buyer looking to buy a home in Manhattan may be interested in different features that a buyer looking to buy a home in Houston. For example, one of the most important attributes to the Manhattan buyer may be that a property has sufficient parking spaces, as parking may be limited at most Manhattan homes. On the other hand, a buyer in Houston may not be as concerned about the number of parking spaces, as most properties may come with more than enough parking space.

As another example of tailoring attributes to a specific user, the system may be configured to determine that a user has a family comprising a spouse and several kids, and may therefore determine that a large yard, proximity to schools, proximity to parks, and/or the like may be more important to that user than to a user without a family, even if the user did not specifically indicate to the system that those attributes were important.

Figure 9:
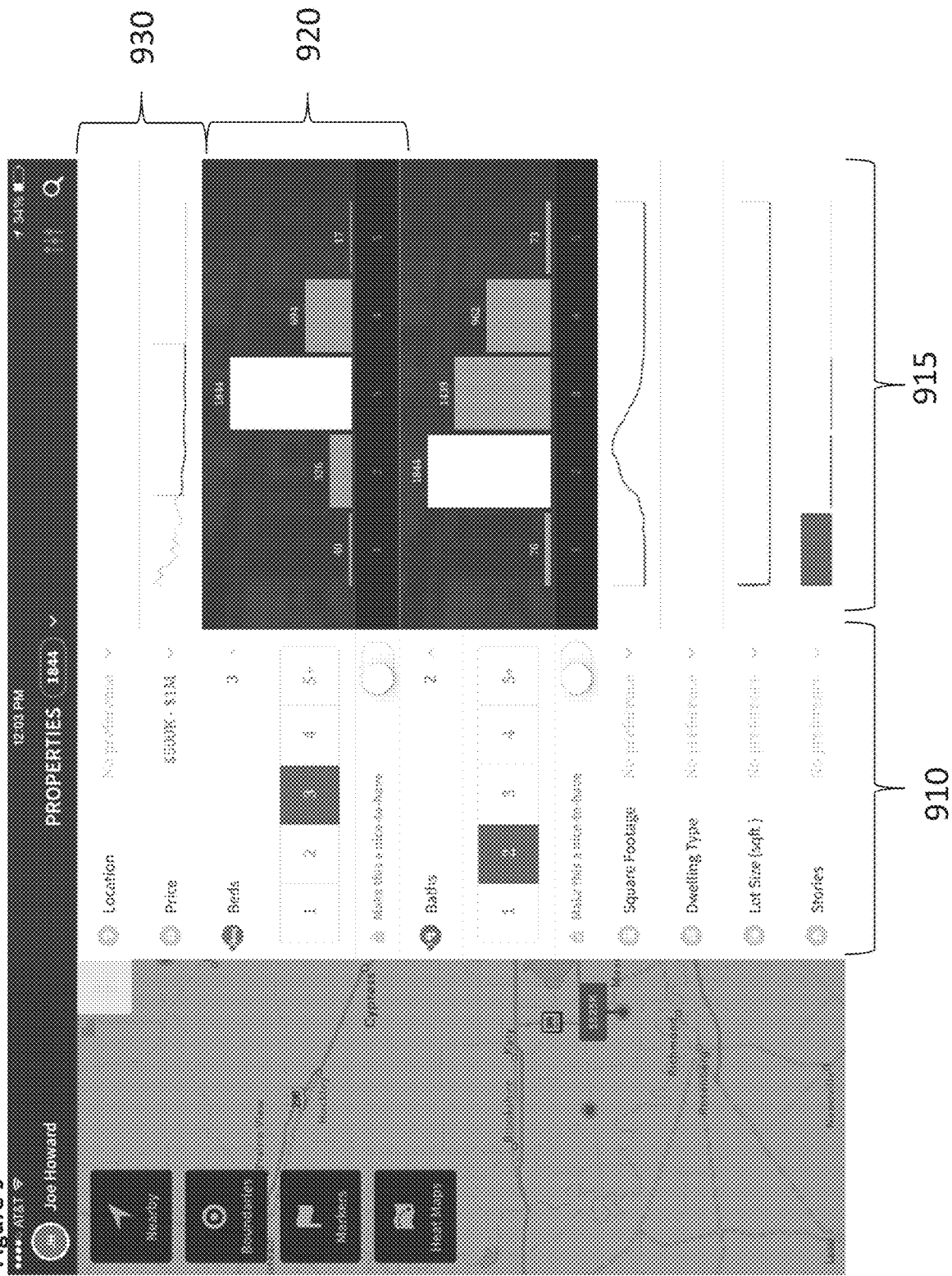
FIGS. 9 and 10 depict embodiments of user interfaces of a user access point system illustrating a contextual search panel.
Figure 10:
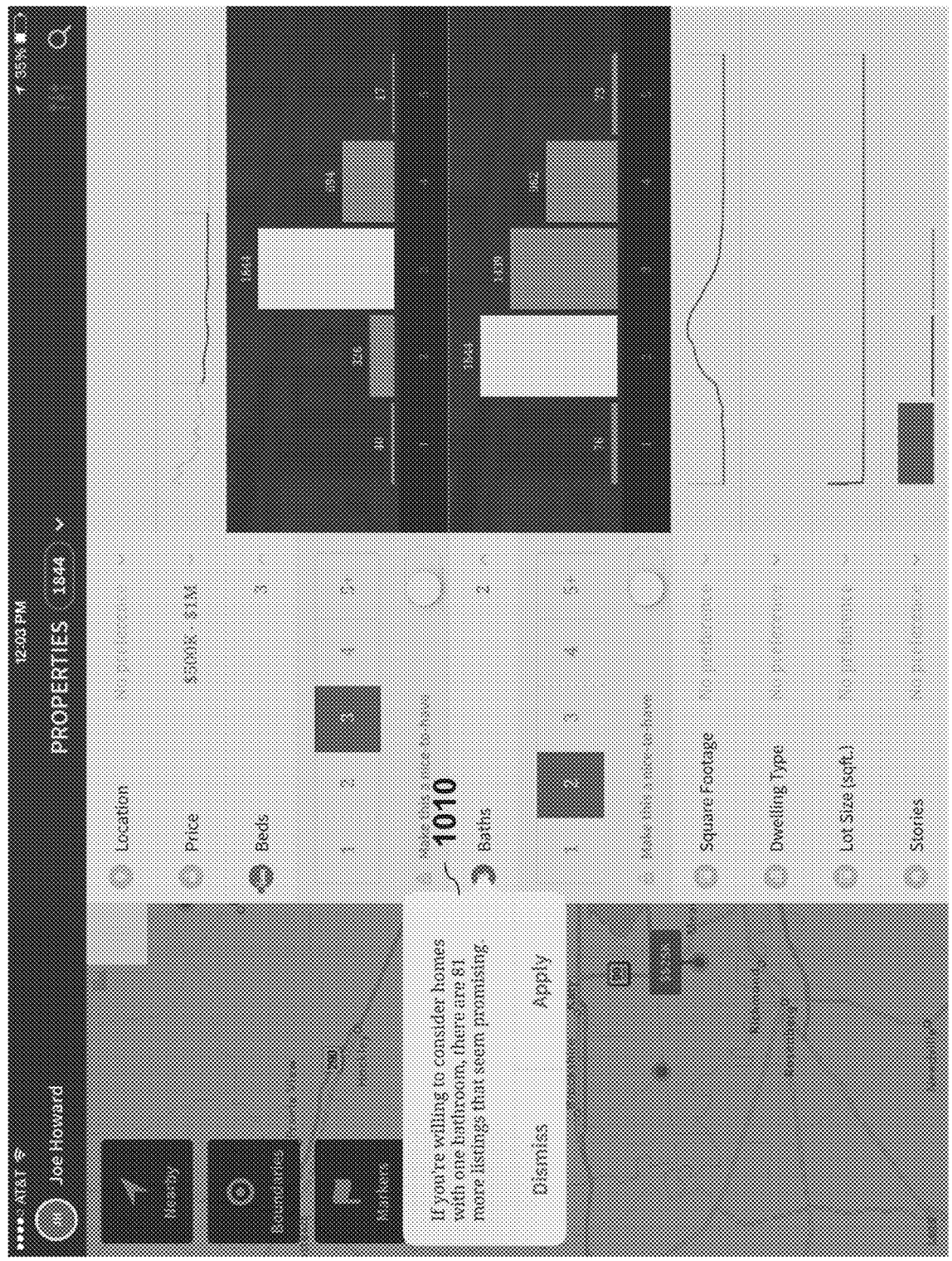

In some embodiments a recommendation system may be configured to provide information to a user about search results in addition to the results themselves. For example, the system may provide a search context panel as shown in FIGS. 9 and 10. The search context panel in some embodiments is designed to show the number of additional properties available above and below that particular price range if the buyer is willing to adjust those criteria. This data may also be provided for other attributes in addition to price. The system can be configured to surface or display the number of alternative properties available based on modifications to any number of the search facets (beds, bathrooms, feature-specific facets, and/or the like).

The search context panel provides information about potential properties of interest at the margins or outside of a client's stated search parameters in order to assist the agent in rapidly identifying a broader set of potential home candidates for the client. In some embodiments, the search context panel uses a suggestions model to automate and improve the process of detecting properties of interest to provide to a user based on the selected search criteria. In an embodiment, the system is configured to generate or cause a pop-up window to appear, wherein the pop-up window informs the user of the number of other available properties that would be available if the user were willing to modify one or more criteria. For example, the pop-up may recommend changing the value of an attribute from one value to another, changing a price range, or changing other constraints. The system may provide this information using natural language.

In one embodiment, to determine which search parameters to recommend changing, and how to change them, the system evaluates multiple potential recommended changes to each of the search parameters and determines which new listings would be included based on the new parameters. For example, the new system may attempt to change a parameter by fixed or relative amounts and analyze the results for results not in the original search results. The results may be analyzed to determine which changes generate the most new listings. The system may then determine which parameter change to recommend based on the number of number of new listings in the results and the amount of change to a parameter. In some embodiments, the new listings are scored by the system according to their similarity to one or more properties that the buyer has expressed interest in. For example, each new listing may be given a recommendation score as described above to determine the likelihood that a user will be interested in the listing. The system may then recommend a parameter change based on the recommendation scores of the new properties in the search results with the change. This provides an advantage in that the recommended parameter change will provide listings predicted to be of interest to the user instead of many listings that the user is not likely to be interested in. In some embodiments, the system may use the combination of the number of new listings in the updated search results and the recommendation scores of the listings to determine a recommended parameter change for the user or client.

In some embodiments, the system may propose new constraints to the user or client. For example, a buyer interested in purchasing real estate may search for properties meeting a set of constraints, one of which is a geographic location, such as a neighborhood. Sometimes, the buyer may not see many results. For example, many listed properties in the neighborhood may be out of a selected price range, properties may not meet other constraints, or the neighborhood may not have many properties currently for sale. The system may provide the buyer with additional suggestions of similar neighborhoods.

Neighborhoods may be considered similar based on a comparison of attributes of each neighborhood. The attributes may be determined by the system, from an outside source, from census data, or from other sources. In some embodiments, the recommendation system may determine which neighborhoods are similar by studying a variety of factors about the neighborhoods. For example demographic and census data as well as the types of homes, schools, and attractions in a neighborhood may be taken into account. Some example neighborhood characteristics may include population density, number of households, average household size, percentage of married households, percentage of households with children, age distributions, primary languages, average travel time to work, modes of transportation, housing costs, home ownership percentage, home values, age of homes, income levels, education levels, employment levels, occupations, industries, or other metrics which may indicate the similarity of neighborhoods. In some embodiments, the system uses a self-organizing neural network to determine which neighborhoods are similar. The system may then recommend that a user include as constraints additional neighborhoods having similar attributes or characteristics to the originally selected neighborhood and that are still geographically close to the neighborhood that was the original parameter.

The system may be configured to offer updated parameters for other constraints as well. For example, constraints for a home may include a number of bedrooms, a square footage, a lot size, a proximity to schools, and/or the like. If the user has set a maximum value for houses to be returned in the search, there may still be many results very close to the price range. For example, if the user sets an upper limit at $250,000, there may be many results between $250,000-$300,000 that the user may be interested in. The system may recommend to the user to consider increasing the upper price limit to view the other properties. This may provide several benefits. First, if the user has already viewed all the properties with the set constraints, it provides the user with a way to find new properties. Second, the parameter modification component may work in conjunction with the disclosed recommendation systems. Thus, it may consider preference history of the user and selected items of the user to find similar items. The system may then consider many options for updating parameters and determine which recommendation to update the parameter gives not only more results, but the best results based on expressed or derived user preferences.

In some embodiments, a recommendation system is configured to utilize hard and/or soft constraints in property searches. For example, the system can be configured to have a virtual lock switch that a user can toggle to determine whether hard or soft constraints are being used. In some embodiments, hard versus soft constraints can be toggled on and off individually for each search criteria. For example, a user may indicate a maximum and minimum square footage. However, if square footage is toggled to be a soft constraint, the system can be configured to still provide results that are outside of the square footage requirements, such as if the system determines that, based on that specific user's preferences or history, the user may still be interested in a property that is outside of the criteria for the soft constraint.

In some embodiments a recommendation system is configured to enable a user to generate a custom geographic region to use as a constraint for search results. For example, the consumer may be able to create a hard constraint such that only properties in a specific geographic region will be surfaced in the search results. The user may define regions matching a selected shape, draw a region boundary, or use other interactive tools to set a geographic region. After setting a geographic region, the system may be configured to enable the user to adjust the boundaries of the region. For example, the user may be able to the boundary of a region, remove a portion of the geographic region, or add an additional geographic region to the constraint.

In some embodiments, the system may assist the user in generating the boundaries of the region. For example, the system may snap boundaries defined by the user to regional landmarks. For example, the user may draw a boundary near a road, and the system may recognize the proximity and snap the boundary set by the user to the road. The system may also enable the user to set a geographic region based on set areas such as neighborhoods, school districts, or other local geographic regions. In some embodiments, the recommendation system may generate a geographic region automatically for the user based on the locations of listings returned in a search. For example, the recommendation system may generate a geographic region using the location of properties as nodes indicating the boundary of the region. In other embodiments, the recommendation system may generate a geographic region in other manners based on the location of the listings of interest to the user.

After a geographic region is set, the user may be able to further refine the region. For example, the user may be able to combine two regions to create a second region. For example a user may set one geographic region by placing nodes to establish the boundaries of the area. The user may also want to define a region based on proximity to a landmark. The system may enable a user to create a geographic region that is the intersection of the drawn boundary and the area within a specified proximity to the landmark. In some embodiments, the system may enable the user to combine any number regions to create a searchable region. The user may also be able to cut out portions of the region that the user does not want to search.

As the geographic regions selected by a user are altered, the system may store the shape and boundaries of the region based on vector graphic data defining the region. For example the boundary may be stored as a set of vectors defining portions of the geographic region. The system may optimize the set of vectors as the user updates the customizable geographic region. For example, if a user erases a portion of the geographic region, the system may change the vectors used to define the boundary of the area. The optimized vectors used to store the geographic region defined by the user may represent areas in a manner separate from how the user defined the geographic region. For example, the user may have set a geographic region by placing nodes on a map. The user may be able to place any number of nodes on the map and move the nodes around the map after placed. While adjusting the map, the user may place nodes in a way that leads to a self-intersecting area. The system may not be configured to accept vectors in a format that leads to self-intersecting areas. As a result, the system may store the geographic region in two formats. The first format may be for use by the user, wherein the nodes or shapes created by the user are stored and may be manipulated by the user. The second format may be one that the system can use when implementing a search using the custom geographic region as a constraint. The second format may be a specified format required by the system in order to carry out a search using the geographic region as a constraint. For example, the system may require a geographic region defined based on a set of vectors representing the boundary of the region defined by the user.

User Access Point Interface

FIG. 1 is an embodiment of a schematic diagram illustrating a user access point system 100. The user access point system 100 may be, for example, a computer connected to a network, a smartphone, a tablet computer, or any other electronic device capable of communicating electronically with a recommendation system as described herein. The user access point system 100 illustrated in FIG. 1 is shown illustrating an electronic display of a recommendation as generated by a recommendation system, such as the recommendation system 202 described below and illustrated in FIG. 2.

The electronic display of the user access point system 100 illustrated in FIG. 1 comprises a chosen home or selected item 102, various alternative items 104, a list of item features 106, a recommendation score 108 for each alternative item, and a search box 110. The leftmost column of listings illustrates the selected item 102, which in this embodiment is a real estate listing. A user of the user access point system 100 may have selected the selected item 102 and/or otherwise expressed a preference in the selected item 102 by, for example, clicking on or otherwise selecting the selected item 102 on a previous screen of this software program, entering an MLS ID number into the search box 110, or the like. In some embodiments, a recommendation system is configured to decompose the selected item 102 into its various features as shown by the item features 106. For example, in this embodiment, the recommendation system has decomposed the selected item 102 into its price, year built, bedrooms, bathrooms, floors, square footage, price per square foot, lot size, price per acre, and kitchen and dining features. Although this embodiment illustrates these specific item features, other embodiments may illustrate fewer or additional features. Additionally, some embodiments of recommendation systems may be configured to take into account one or more additional other features that may not be displayed to a user. For example, the system may be configured to display, on the user access point system 100, only the features 106 that a user may personally be interested in, even though the system took into account various other features in generating the recommendation scores 108. For example, the recommendation system may have also taken into account a color of house, a building style, crime rates in a neighborhood, proximity to sex offender locations, and/or various other features that may be relevant to whether an alternative item is predicted to be preferred.

As is shown in FIG. 1, there are five alternative items 104 displayed. The recommendation system displays the alternative items 104 in descending order by their respective recommendation scores 108. For example, the first alternative item 104 has a recommendation score of 68.64, and the last alternative item 104 has a recommendation score shown on this screen has a recommendation score of 65.24. Although this embodiment illustrates recommendation scores being sorted in descending order, in some embodiments, a recommendation system may be configured to calculate recommendation scores wherein a lower recommendation score indicates a higher predicted preference. For example, a system may be configured to calculate a recommendation score of 0 or 1 as being the highest prediction of user preference for that alternative item. For example, a recommendation score of 0 in some embodiments may indicate that the alternative item is identical to the selected item. In some embodiments, a recommendation score may be limited to a certain range, such as 100 through 0. In other embodiments, there is no upper and/or lower bound to the recommendation score.

In some embodiments, the user access point system 100 can be configured to enable the user to select one of the alternate items 104. In some embodiments, after a user selects one of the alternate items 104, that alternate item becomes the selected item 102, and the recommendation system is configured to repeat the recommendation process to determine items to recommend to the user based on the new selected item. Additionally, as described above, although this embodiment illustrates a recommendation of alternative items based on home listings, such a system may alternatively be utilized with used cars, used goods, household goods, movie viewing experiences, and/or the like.

In some embodiments, a recommendation system may even be configured to generate recommendations of items that may traditionally be in different categories. For example, if a user selects a used Ferrari sports car as the selected item, the recommendation system may in some embodiments be configured to provide alternative recommendations of not only alternative sports cars but also, for example, luxury yachts or other luxury items. In some embodiments, a recommendation system can be specifically configured to provide recommendations of items in alternative "categories." In other embodiments, alternative items in different "categories" may appear in a recommendation spontaneously, because the scoring model has calculated a relatively high recommendation score merely or primarily based on applying a scoring model.

Recommendation System

Figure 2:
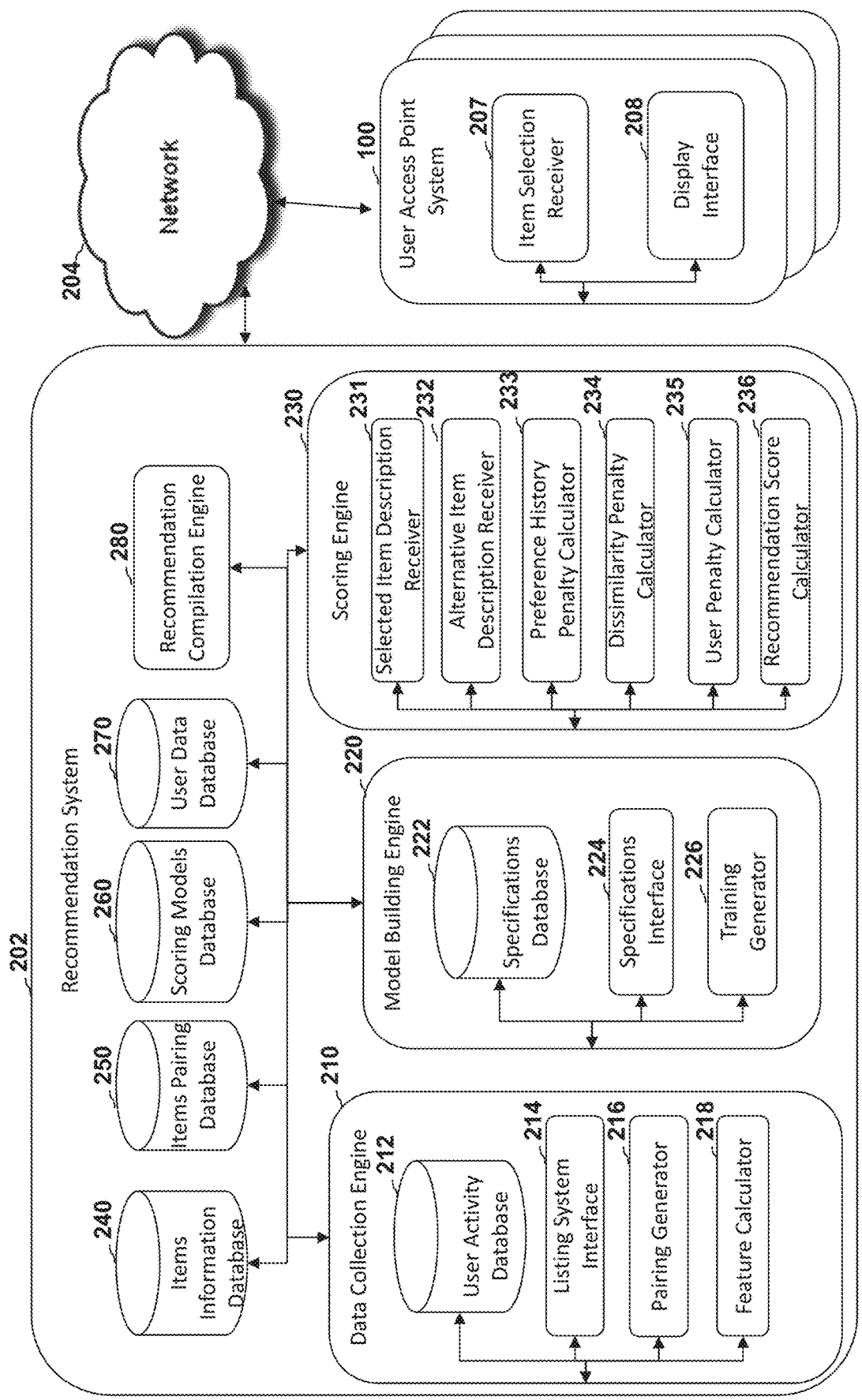
FIG. 2 is a block diagram depicting an embodiment of a recommendation system in communication with one or more user access point systems.

FIG. 2 is a block diagram depicting an embodiment of a recommendation system 202 in communication with one or more user access point systems 100. The recommendation system 202 may be configured to communicate with, for example, the user access point systems 100 illustrated in FIG. 1, through an electronic network 204. The network 204 may comprise, for example, the internet, a cellular data network, a local area network, a wide area network, and/or the like. In some embodiments, a user access point system 100 is integrated into a recommendation system 202, and the user access point system does not have to communicate through a network with the recommendation system. In some embodiments, a recommendation system 202 can be configured to communicate substantially simultaneously and/or substantially in real time with various user access point systems 100. For example, a recommendation system 202 can be configured to operate as a "cloud" service providing recommendations to 10's, 100's, 1,000's, 10,000's, or more users and/or user access point systems 100 substantially simultaneously.

In some embodiments, the recommendation system 202 can be configured to receive an indication of a selected item from a user access point system 100, to generate a recommendation of alternative items based on that selected item substantially in real time, and then to return and/or present the generated recommendation to the user access point system 100 substantially in real time. In some embodiments, users of a user access point system 100 likely will not tolerate waiting an extended amount of time to receive a recommendation of alternative items. For example, a user of a user access point system 100 may be a user browsing an item listing service, such as a real estate listing service, on his or her tablet computer through an internet web browser. When that user selects an item, the user will likely expect to have the alternative listings presented to them practically immediately, such as in the amount of time it takes for a web page to load. Therefore, the recommendation system 202 in some embodiments requires at least one computer system to operate at the speeds that are required to make such a system practical and also to keep track of and calculate the countless variables required to generate recommendation scores for various alternative items with respect to a selected item.

The user access point system 100 comprises an item selection receiver 207 and a display interface 208. The display interface 208 may be configured to display listings to users, such as is illustrated in FIG. 1. The item selection receiver 207 may be configured to receive selections of selected items from a user, such as by enabling the user to click on or otherwise select a listing displayed using the display interface 208.

The recommendation system 202 comprises a data collection engine 210, a model building engine 220, a scoring engine 230, an items information database 240, an item pairings database 250, a scoring models database 260, a user data database 270, and a recommendation compilation engine 280. The data collection engine 210 can be configured to gather and analyze data from historical and/or real time user interactions with one or more item listing services, such as home and/or used car listing services. The model building engine 220 can be configured to build scoring models based on the data collected by the data collection engine. The scoring engine 230 can be configured to calculate recommendation scores for alternative items utilizing scoring models accessed from the scoring models database 250. The recommendation compilation engine 280 can be configured to utilize the scoring engine 230 to compile recommendation scores for a variety of alternative items and to then generate a final recommendation or list of recommendations for presentation to a user or user access point system.

The items information database 240 can be configured to, for example, contain information describing various items available for sale, such as the current inventory of homes, vehicles, etc. for sale. In some embodiments, the items information database 240 can be configured to contain information related to both historical items listed for sale and current items listed for sale. The item pairings database 250 can be configured to contain information related to pairs of items that have been viewed by users, for use in building scoring models. The scoring model database 260 may store scoring models generated by the model building engine. In some embodiments, the recommendation system 202 comprises the user data database 270, which can be configured to contain information relating to various users of the recommendation system 202. This information can comprise, for example, stored preferences of users and/or user identifications, such as to enable identification of listings viewed by the same user, even if those listings may have been viewed on various item listing systems.

The data collection engine 210 comprises a user activity database 212, a listing system interface 214, a pairing generator 216, and a feature calculator 218. The data collection engine 210 can in some embodiments be configured to operate as described below and further illustrated in FIG. 6. In some embodiments, the user activity database 212 can be configured to log and/or store information related to user activity on various item listing services. The information for storage in the user activity database 212 can be retrieved by, for example, the listing system interface 214, which may be configured to interface with one or more item listing services to gather such data. In some embodiments, one or more item listing systems is incorporated into the recommendation system 202 and/or the data collection engine 210, and the listing system interface 214 is therefore not necessary. In other embodiments, the recommendation system 202 and/or data collection engine 210 comprises one or more listing services and the data collection engine 210 also comprises the listing system interface 214 for gathering information from additional external listing systems.

The pairing generator 216 can be configured to analyze the user activity data gathered from the various listing systems and to generate pairs of listings that were viewed by the same user. The feature calculator 218 can be configured to calculate feature differences of the items in the generated pairs. For example, one pair may comprise an item having listing price 1 and an item having listing price 2. The feature calculator 218 may, for example, be configured to calculate a feature difference, such as a percentage difference in listing price 1 and listing price 2.

The model building engine 220 can be configured to analyze the user activity and/or item pairings generated by the data collection engine 210 to generate scoring models. The model building engine 220 comprises a specifications database 222, a specifications interface 224, and a training generator 226. The specifications database 222 can be configured to contain one or more model specifications for use in configuring the system to generate the scoring models. The specifications interface 224 can be configured to, for example, enable an administrator of the recommendation system 202 to configure the model specifications to alter the way the model building engine 220 generates scoring models. The training generator 226 can be configured to retrieve model specifications from the specifications database 222 and to apply those specifications to historical item pairings from the item pairings database 250 to generate one or more scoring models for storage in the scoring models database 260 for later retrieval and use by the scoring engine 230.

The scoring engine 230, in some embodiments, can be configured to generate recommendation scores for alternative items with respect to a selected item. The scoring engine 230 comprises a selected item description receiver 231, an alternate item description receiver 232, a user preference history receiver 233, a dissimilarity penalty calculator 234, a user score calculator 235, and a recommendation score calculator 236. The selected item description receiver 231 can be configured to receive a description of the selected item, such as the selected item 102 illustrated in FIG. 1. In some embodiments, the selected item description receiver 231 can be configured to receive information describing the individual features of the selected item from, for example, the user access point system 100. In other embodiments, the selected item description receiver 231 may be configured to receive, for example, a unique identifier which identifies an item for which information is stored in the items information database 230. The selected item description receiver 231 can then be configured to retrieve the necessary feature information from the items information database 240 utilizing that identifier.

The alternate item description receiver 232 can be configured to operate similarly to the selected item description receiver 231, but to receive information related to an alternative item. For example, the dissimilarity penalty calculator 234, user penalty calculator 235, and recommendation score calculator 236 may be configured to select an alternative item to score against the selected item and to send either data relating to that alternative item or an identifier of that alternative item to the alternative item description receiver 232.

The user preference history receiver 233 may be configured to receive the preference history for and a scoring model related to a current user. For example the user preference history receiver 233 may access data about the user from user data database 270. The user data database 270 may include information provided by the data collection engine 210, such as information stored in user activity database 212. The user preference history may include information about items the user has previously favorited or disliked. The user preference history may also include demographic or other data about the user that may indicate the likelihood that a user will prefer an alternative item that the scoring engine 230 is analyzing.

The dissimilarity penalty calculator 234 may be configured to analyze the selected item and alternate or alternative items to calculate the differences in their features and generate a dissimilarity penalty based on those differences. For example, the dissimilarity penalty calculator 234 may calculate a percentage price difference between the items, a difference in how age of items, a difference in the condition of the items, etc. The user penalty calculator 235 may be configured to generate a penalty for an alternative item based on the likelihood a user will prefer the item. The user penalty calculator 235 may apply a scoring model generated by the model building engine 220 to the alternative item being evaluated. In some embodiments, the dissimilarity penalty calculator 234 and the user penalty calculator 235 are combined into a single penalty calculator. The single penalty calculator may apply a scoring model from the scoring models database 260 to calculate a dissimilarity penalty based on the similarity of the selected item and the alternative item where the similarity model is generated to estimate a penalty specific to the user. For example the scoring model may be generated such that the difference between attributes of items are weighted based on the user preference history for the specific user.

The recommendation score calculator 236 can be configured to calculate a recommendation score of the alternative item as compared to the selected item. For example, the recommendation score calculator 236 can be configured to generate a score based on the calculated dissimilarity and user penalties. The recommendation score calculator may then output a recommendation score to the recommendation compilation engine 280.

The recommendation compilation engine 280 can be configured to, in some embodiments, one by one, present selected item and alternative item information to the scoring engine 230 to calculate a recommendation score for that alternative item. The recommendation compilation engine 280 can be configured to repeat this process for all potential alternative items and/or a subset of the potential alternative items and to then combine these alternative items into a recommendation for presentation to the user access point system 100 by sorting them by their relative recommendation scores and potentially choosing a subset of, for example, only the items with the highest recommendation score.

In some embodiments, a recommendation system 202 may be configured to communicate with other systems in addition to or in lieu of user access point systems 100. For example, a computer system that does not allow users direct access through that system may still require recommendations of alternative items and utilize the recommendation system 202 to retrieve that recommendation.

Example Recommendation Process

Figure 3:
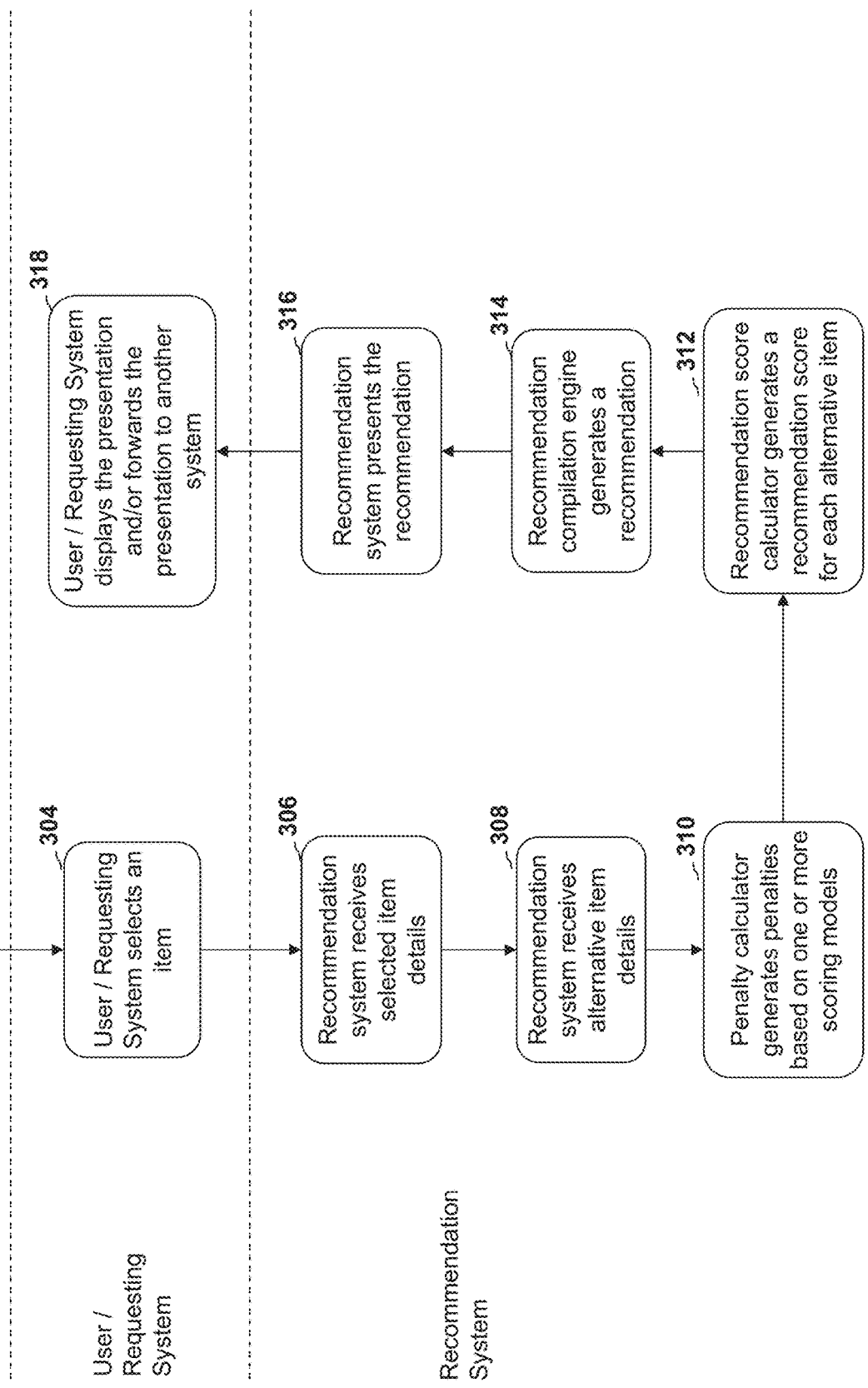
FIG. 3 depicts an embodiment of a process flow diagram illustrating an example of selecting alternative items from a candidate set for recommendation to a user.

FIG. 3 depicts an embodiment of a process flow diagram illustrating an example of generating a recommendation of alternative items. The process flow illustrated in FIG. 3 may be performed by, for example, the recommendation system 202 and user access point system 100 shown in FIG. 2. At block 302 a user and/or requesting system starts the process. For example, a user using a user access point system 100 may start the process. In some embodiments, a requesting system separate from a user access point system may start the process. At block 304 the user and/or requesting system selects an item. For example, a user may select an item using the item selection receiver 207 of the user access point system 100.

At block 306 the recommendation system receives details of the selected item. For example, the recommendation system 202 may receive details of various attributes of the item selected at block 304. At block 308 the recommendation system receives alternative item details. For example, the recommendation system may receive details of various attributes of a plurality of alternative items.

At block 310 the recommendation engine 202 calculates penalties for the alternative item based on one or more scoring models. For example the recommendation engine 202 may generate a penalty using the dissimilarity penalty calculator 234 and the user penalty calculator 235. In some embodiments additional penalties may also be calculated, or only one penalty may be calculated. For example, the system may calculate a similarity penalty, a preference history penalty, and a user penalty based on user demographics. In some embodiments, the dissimilarity penalty calculator generates the dissimilarity penalties as shown and described with reference to FIG. 5 and/or FIG. 6. At block 312 a recommendation compilation engine generates a recommendation. For example, a recommendation compilation engine may be configured to sort the plurality of alternative items based on each item's dissimilarity penalty. The recommendation may, for example, comprise the list of alternative items sorted based on each item's dissimilarity penalty.

At block 314, the recommendation compilation engine presents the recommendation. For example, the recommendation compilation engine may transmit data representing the recommendation through a network. At block 316, the user and/or requesting system displays the presentation and/or forwards the presentation to another system. For example, the display interface 208 of the user access point system 100 may display the recommendation to a user using an electronic display. In another example, a requesting system transfers the presentation to another system through a network to allow another system to present or otherwise utilize the recommendation.

Figure 4:
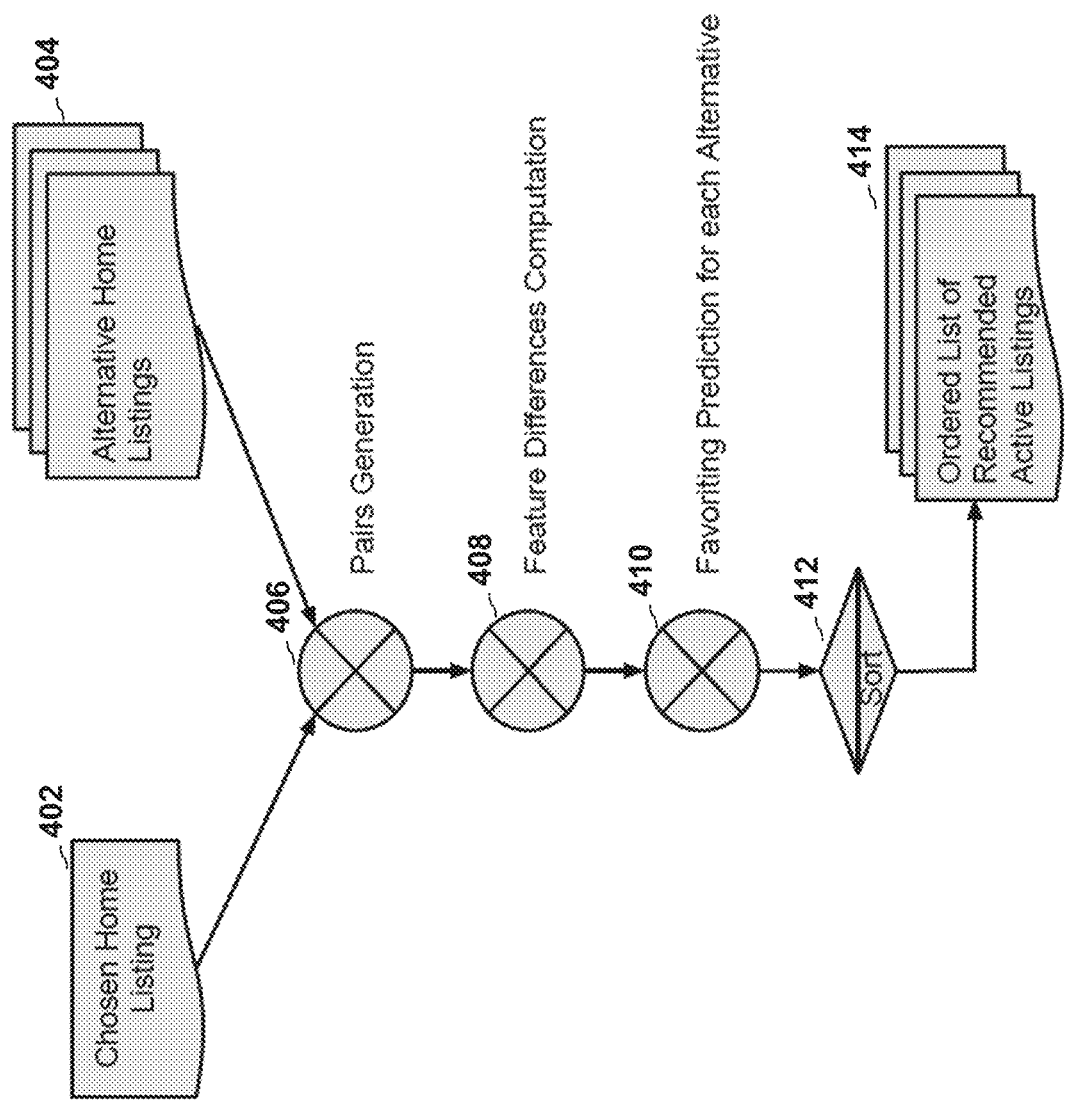
FIG. 4 depicts an embodiment of a process flow diagram illustrating an example of sorting alternative items based on similarity to a selected item and historical preferences of a user.

FIG. 4 depicts another embodiment of a process flow diagram illustrating an example of generating a recommendation of alternative items based on a selected item. At block 402, a chosen home listing is provided. For example, a user access point system 100 may enable a user to select or otherwise express interest in a specific home listing. At block 404, alternative home listings are provided. For example, the recommendation compilation engine 248 of the recommendation system 202 may be configured to retrieve information related to alternative home listings from the items information database 240. At block 406, pairs of listings are generated. For example, the recommendation compilation engine 248 may be configured to generate a pair for each of the alternative home listings, wherein the pair comprises one alternative home listing and the chosen home listing or selected item.

At block 408, the system computes feature differences. For example, the feature calculator 218 illustrated in FIG. 2 may be configured to calculate differences, as further described above, of each listing pair. At block 410, favoriting prediction for each alternative is performed. For example, the recommendation score calculator 236 may be configured to calculate a recommendation score for each alternative listing as compared to the chosen or selected listing. In some embodiments, the scoring engine 230 may access a scoring model associated with the user in user data database 270 to predict the likelihood of the user favoriting the alternative items. The scoring model may be configured to generate a score based on features common to properties that the user has favorited or otherwise indicated an interest or preference for previously.

At block 412, the alternative listings are sorted by their recommendation scores. At block 414, an ordered list of recommended active listings is presented. For example, the recommendation system 202 may be configured to present the ordered list to the user access point system 100 for display to the user as illustrated in FIG. 1.

Figure 5:
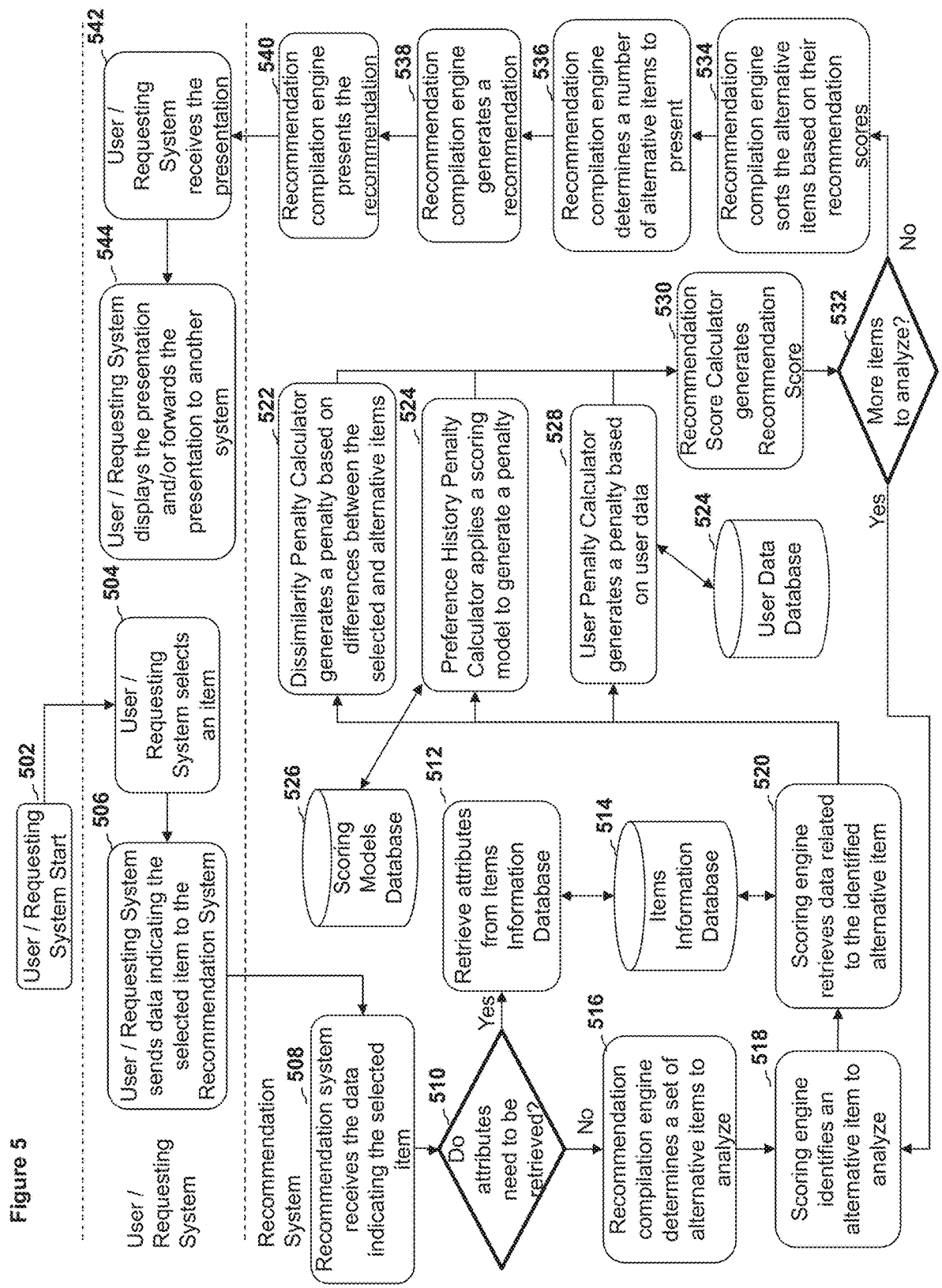
FIG. 5 depicts an embodiment of a process flow diagram illustrating an example of generating recommended items from a set of alternative items.

FIG. 5 depicts another embodiment of a process flow diagram illustrating an example of generating a recommendation of alternative items based on a selected item. The process begins at block 502. At block 504, a user or requesting system selects an item. For example, the user access point system 100 illustrated in FIG. 2 may enable a user to select an item, such as a home listing, using the item selection receiver 207. At block 506, the user or requesting system sends data indicating the selected item to the recommendation system. For example, the user access point system 100 may be configured to send information describing the selected item and/or an identifier of the selected item through the network 204 to the recommendation system 202.

At block 508, the recommendation system receives the data indicating the selected item from the user or requesting system. At block 510, the process flow varies depending on whether attributes for the selected item need to be retrieved. For example, if the user access point system 100 sent merely an identifier of a selected item to the recommendation system 202, the recommendation system 202 may need to retrieve the details of that selected item. If attributes do need to be retrieved, the process flow continues to block 512. At block 512, the recommendation system retrieves attribute from the items information database. For example, the selected item description receiver 231 illustrated in FIG. 2 can be configured to retrieve feature or attribute information relating to the selected item from the items information database 240, illustrated as the items information database 514 in FIG. 5.

After item attributes have been retrieved, or if item attributes did not need to be retrieved at block 510, the process flow continues to block 516. At block 516, a recommendation compilation engine determines the number of alternative items to analyze. For example, in some embodiments, the recommendation compilation engine 280 may be configured to calculate a recommendation score for each and every alternative item existing in the items information database 250. However, in other embodiments, the recommendation compilation engine 280 may be configured to select only a subset of potential alternative items for which to calculate recommendation scores. For example, the system may be configured to know that some alternative items will have a relatively low recommendation score without having to actually calculate a recommendation score. For example, an administrator may set a rule within the recommendation system that indicates that when a selected item is a house, used vehicles should not be considered as alternative items. Note that, as further described above, systems as described herein do not need to categorize items into different categories such as homes and cars. In some embodiments, a system can be configured to calculate a recommendation score for each and every item, and then to present only the ones with the highest recommendation scores as a recommendation to the user. Realistically, if the items information database containing all alternative items contains, for example, homes and used vehicles, it may be determined in advance that all used vehicles would have a sufficiently low recommendation score that it is not worth spending the extra time and/or computer processing power to calculate these recommendation scores, since it is likely they would not have a high enough recommendation score to be offered as a recommendation.

At block 518, the scoring engine retrieves data related to one alternative item. For example, the alternate item description receiver 232 shown in FIG. 2 may be configured to retrieve information from the items information database 240 related to the first alternative item, such as information describing its features and attributes. At block 520, a dissimilarity penalty calculator generates a penalty based on differences between the selected item and the alternative item. For example, the differentiation generator may calculate feature differences such as a percentage price difference, a distance the items are located apart, etc. At block 522, a user penalty calculator applies a scoring model to generate a recommendation score for that alternative item. For example, the user penalty calculator 235 shown in FIG. 2 may be configured to retrieve a scoring model from the scoring models database 260 and to apply that model to the features of the alternative item and/or to the differences in features of the selected item and alternative item to generate a user specific penalty. The penalty calculator may be configured to access the user data database 526, which may be the same as user data database 270 shown in FIG. 2, in addition to the scoring models database 526 to calculate a penalty specific to the user based on historical preferences and/or demographic data stored for the user or client. At block 528, the scoring engine may then generate a recommendation score for the alternative item, such as with recommendation score calculator 236 shown in FIG. 2. The recommendation score may be based on the combination of the dissimilarity penalty and the user specific penalty. At block 530 the recommendation score calculator generates a recommendations score. The process may also be performed by the recommendation compilation engine 280.

At block 532, the process flow varies depending on whether there are more alternative items to analyze. For example, if the recommendation compilation engine determined at block 516 that ten alternative items should be analyzed, the process flow will return back to block 518 until all ten items have been analyzed. Note that ten is merely an example and in various embodiments the recommendation compilation engine may determine to analyze ten, 100, 1,000, 10,000, or more alternative items.

Once all alternative items have been analyzed, the process flow proceeds from block 530 to block 534. At block 534, the recommendation compilation engine sorts the alternative items based on their recommendation scores. For example, the recommendation compilation engine 280 may be configured to sort the alternative items in descending order based on their relative recommendation scores. At block 536, the recommendation compilation engine determines a number of alternative items to present. For example, an administrator may configure the recommendation system to only present a certain number of alternative items. In other embodiments, the user access point system may indicate to the recommendation system how many alternative items the user access point system wants returned. In some embodiments, the recommendation compilation engine determines to return all alternative items, or a subset of alternative items based on the recommendation scores of the alternative items.

At block 538, the recommendation compilation engine generates a recommendation. For example, the recommendation compilation engine can be configured to eliminate all but the highest recommended items to limit the number of recommended items to the number determined at block 536. At block 540, the recommendation compilation engine presents the recommendation. For example, the recommendation compilation engine 280 can be configured to communicate with the user access point system 100 through the network 204 to present the recommendation to the user access point system 100.

At block 542, the user or requesting system receives the presentation. At block 544, the user or requesting system displays the presentation and/or forwards the presentation to another system. For example, the user access point system 100 illustrated in FIG. 2 may be configured to display using the display interface 208 the recommendation to a user as illustrated in FIG. 1.

Scoring Model Generation

Figure 6:
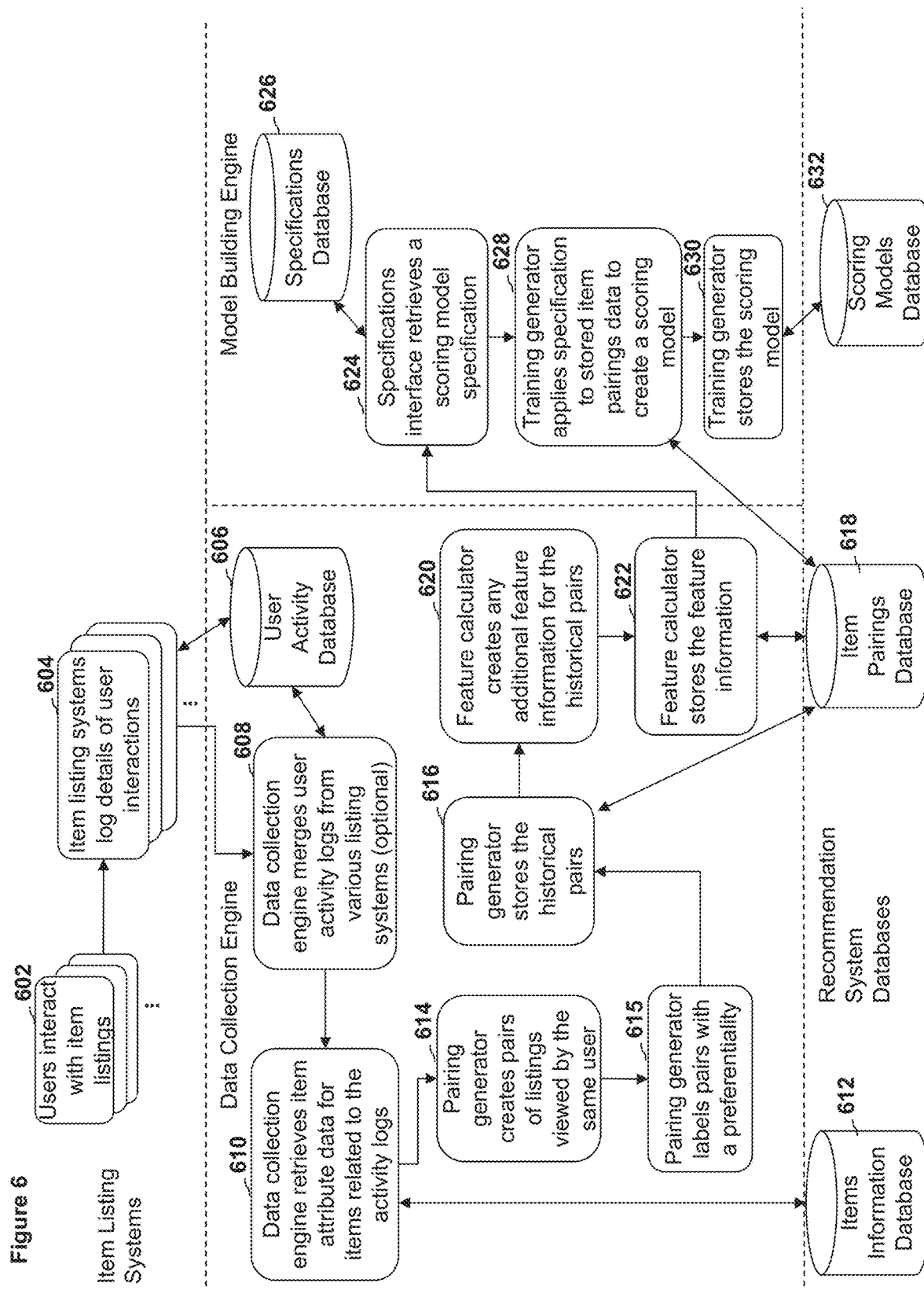
FIG. 6 depicts an embodiment of a process flow diagram illustrating an example of generating scoring models based on historical preferences of a user.

FIG. 6 depicts an embodiment of a process flow diagram illustrating an example of building one or more scoring models. The process flow begins at block 602 when users interact with item listings. For example, one or more item listing systems may enable users to interact with listings of items, such as homes and used vehicles, and enable the users to select listings, favorite listings, indicate a preference for listings, indicate a lack of preference for a listing, indicate a listing is not a favorite, rank listings, purchase listings, indicate a price a user would be willing to pay for a listing, and/or the like. In some embodiments, the process flow illustrated in FIG. 6 may comprise thousands, tens of thousands, hundreds of thousands, or more users interacting substantially simultaneously with tens, hundreds, tens of thousands, or more item listing systems.

At block 604, the item listing systems log details of the user interactions. For example, the item listing systems may be configured to store, in an electronic database, such as the user activity database shown at block 606, the interactions of users, such as which listings particular users viewed or interacted with, which listings particular users favorited, purchased, expressed an interest in, and/or the like. In some embodiments, the item listing systems are configured to log these details substantially in real time.

At block 608, a data collection engine optionally merges user activity logs from various listing systems. For example, the data collection engine 210 illustrated in FIG. 2 may be configured to retrieve logs from a multitude of item listing systems and to merge the logs to determine, for example, users on one system that are the same as users on another system, listings on one system that are for the same item that is listed on another system, etc. Merging logs may be advantageous to enable the data collection engine to generate more pairs and/or to enable the model building engine to have specific data to analyze in generating scoring models.

At block 610, the data collection engine retrieves item attribute data for items related to the activity logs. For example, the data collection 210 may be configured to retrieve from the items information database 240 information relating to the features of the individual items that the user activity logs indicate users interacted with. In some embodiments, the item attribute data is provided by the listing systems.

At block 614, a pairing generator creates pairs of listings viewed by the same user. For example, the pairing generator 216 illustrated in FIG. 2 may be configured to analyze the activity logs and generate pairs of listings when the pairing generator determines that those listings were viewed by the same user. At block 615, the pairing generator labels the pairs of listings with a preferentiality. For example, if a user viewed items, A, B, and C, but only liked item C, then the pairs generated at block 614 may comprise AB, AC, BA, BC, CA, and CB. At block 615, the pairs ending in C may be labeled as "preferred" and the other pairs may be labeled as "not preferred." At block 616, the pairing generator stores the historical pairs created at block 614. The pairing generator may store the pairs in, for example, the item pairings database 618 which may be the item pairings database 240 illustrated in FIG. 2.

At block 620, a feature calculator creates any additional feature information for the historical pairs. For example, some feature information may already exist for the items in the pairs, such as a listing price, number of bedrooms, number of bathrooms, mileage, etc. However, other features may need to be calculated after pairs are generated. For example, a difference in price between the listings of a pair may be calculated by the feature calculator after the pair is generated. At block 622, the feature calculator stores the additional feature information, for example, in the item pairings database 618.

At block 624, a specifications interface retrieves a scoring model specification. For example, the specifications interface 224 illustrated in FIG. 2 may be configured to retrieve a model specification from the specifications database at block 626, which may be the specifications database 222 illustrated in FIG. 2. At block 628, a training generator applies the model specification to the stored item pairings data to generate a scoring model. For example, the training generator 226 may implement, for example, linear regression and/or random forests, as further described above, to generate the scoring model. At block 630, the training generator stores the scoring model, for example, in the scoring models database shown at block 632, which may be the scoring models database 244 illustrated in FIG. 2. The scoring model stored in the scoring models database may then be used by the scoring engine 230 as illustrated above with respect to FIGS. 3 through 5 to generate recommendation scores in the process of generating a recommendation.

User Interfaces

Figure 7:
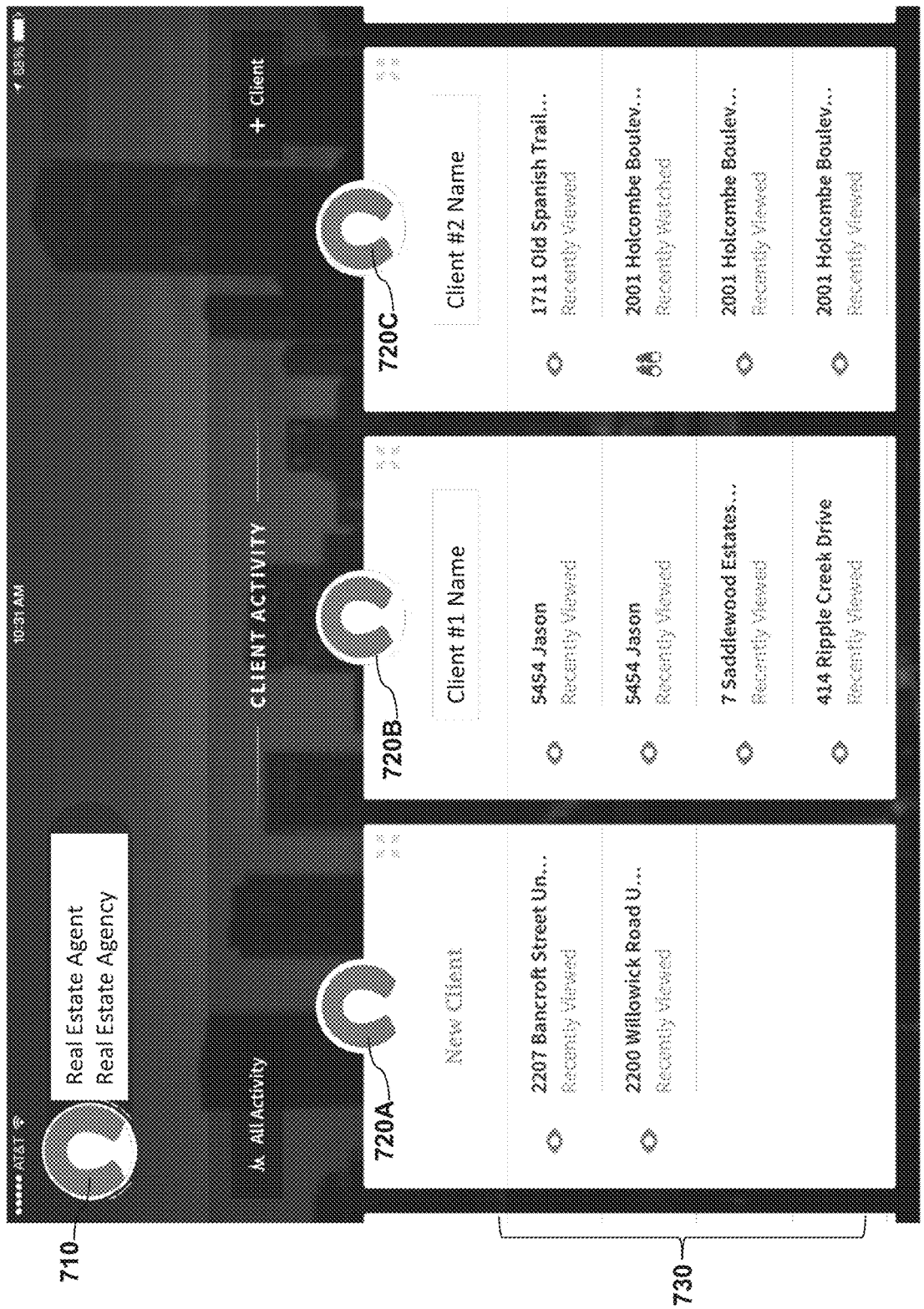
FIG. 7 depicts an embodiment of a user access point system in an embodiment of a recommendation system for use by a real estate agent or other user.

FIG. 7 illustrates an embodiment of a user access point system in an embodiment of a recommendation system for user by a real estate agent or the like. In some embodiments, the system is configured to have different user interfaces for buyers, sellers, real estate agents, and/or the like. In some embodiments, the system is configured to utilize similar user interfaces for all users, but may be configured to have additional or different information for different types of users. For example, in FIG. 7, the real estate agent 710 is provided with information about multiple clients 720A, 720B, and 720C of the real estate agent. The recommendation system 202 may be configured to provided recommended properties, significant attributes, recommended search parameters, and/or the like related to each of the clients for a particular real estate agent. FIG. 7 illustrates a dashboard that allows a real estate agent to quickly access individual client folders, as well as to search independently of a particular client or to view aggregate activity (viewed properties, watched properties, new alerts, property recommendations, and/or the like) for all of the clients. A client "folder" may in some embodiments be a repository for the entire search history of that client. For example, in FIG. 7 the user interface provides the search histories of clients in folders 730. In addition, it may be configured to serve as a repository for other significant attributes system-generated insights and alerts for use by the agent to better serve that particular customer. In some embodiments, identifiers 710 and 720 may be a photograph of a user, such as an agent, client, or other person.

A real estate agent or client may select a specific property to receive more information about the property. FIG. 8 is an example embodiment of an item details page that provides information about significant attributes of a selected or alternative item. In the embodiment of FIG. 8, the item is a real estate listing. In some embodiments, a property details page is intended to provide the agent and his or her buyer with the complete set of property details available from the item information database. In some embodiments, the system is configured to provide insight about significant attributes of the selected item that would be otherwise unavailable to the agent. For example, in FIG. 8, the user is presented with a set of significant attributes for the listed property. Insights may include, for example, comparisons to other properties in the surrounding area as well as complete sets of similar properties that have either been recently sold or are still active in the item information database. This can also include information about various attributes or significant attributes of properties as determined by the system. For example, the system can be configured to analyze various homes on the market, past sales history, and/or user interactions with listings of those items to determine what features are most important. The significant attributes may be accessible to the real estate agent to customize a discussion about the property to the client, or may be accessible to the buyer when the buyer selects a listing.

The system can further be configured to tailor which attributes are displayed to a particular user. For example, the system can be configured to determine both what attributes of properties are significant in general, and what attributes would be more important to a specific user or client. In some embodiments, the system can be configured to analyze preferences of a client, such as preferences provided by the client and/or agent. In some embodiments, the system can also be configured to analyze this along with other information the system has determined about the client to determine which attributes would be most significant to that specific user. The system can then be configured to display to the user the most significant attributes that user would be interested in. As can be seen in FIG. 8, this example of a property detail page displays in the top left corner of the display of six different attributes the attribute 820 that this property is 5% more expensive than similar properties. In this example, the system may have determined that this would likely be the most significant attribute in which the specific client or user would be most interested. The system may determine which significant attributes are most important to an individual by building a model in a manner similar to that described in reference to FIG. 6, and generating a score for attributes such as described in reference to generating a recommendation score as described above. For example, a significant attributes scoring engine may generate attribute scoring models for a user by comparing the historical preferences of a user such as which properties are favorited which are not. The system may then determine which attributes a particular user most likely values more than others and may present the most significant attribute of the specific user first.

In some embodiments, the system can be configured to provide recommendations and/or determine what attributes may be significant to a particular user based on demographic information. For example, the system can be configured to analyze what is important to other people like this specific user, and to infer that this specific user would have similar interests. In some embodiments, the system can be configured to gather information about a specific user from a variety of sources in order to help determine what this specific user is like and what attributes may be important to that user. By tailoring the display of attributes that are most important to a specific user, in some embodiments, every piece of information displayed can be specifically chosen to increase the odds of a sale or conversion for a real estate agent or agent or can help a buyer understand the attributes that drive the price or desirability of an item.

As an example of tailoring attributes to specific users, a buyer looking to buy a home in Manhattan may be interested in different features that a buyer looking to buy a home in Houston. For example, one of the most important attributes to the Manhattan buyer may be that a property has sufficient parking spaces, as parking may be limited at most Manhattan homes. On the other hand, a buyer in Houston may not be as concerned about the number of parking spaces, as most properties may come with more than enough parking space.

As another example of tailoring attributes to a specific user, the system may be configured to determine that a user has a family comprising a spouse and several kids, and may therefore determine that a large yard, proximity to schools, proximity to parks, and/or the like may be more important to that user than to a user without a family, even if the user did not specifically indicate to the system that those attributes were important.

In some embodiments, in addition to enabling a user to create folders manually on behalf of clients, the system is configured to enable an agent using the application to send a survey to a new client in order to conduct a needs analysis that automatically generates a new folder associated with that client with a set of search preferences mapped to the interests expressed in their answers. In some embodiments, the preferences and/or interests are directly from the survey answers. In other embodiments, at least some of the preferences and/or interests are determined by the system as a result of an analysis of the answers provided in survey.

In some embodiments, the survey is delivered to the client via email. A link within the email directs the new client to a web survey. In some embodiments, this web survey is a single-page questionnaire with a fixed set of close-ended questions. In other embodiments, the survey is a multi-page survey that includes close-ended questions, open-ended questions, and/or images. When a client completes the survey, the system can be configured to generate a new folder within that agent's dashboard. In some embodiments, the survey responses are mapped to a set of city-specific search preferences that form the basis for an initial set of search recommendations and alerts.

Search Context Panel

FIG. 9 is an example embodiment of a user interface illustrating a search context panel the system may provide to a user. The search context panel may be accessible after a real estate agent or client runs a search through a search engine. The search context panel may provide information about the results of the search and/or information about the search parameters used. In some embodiments, the search context panel may be particularly configured to provide additional information about listings on the margins of the search results. In the example embodiment, the user interface illustrates user preferences or constraints 910 that are currently being used to perform a search. For example, the system lists as possible constraints for a real estate search: location, price, beds, baths, square footage, dwelling type, lot size, and stories. In some embodiments, fewer or additional constraints may be available. The attributes presented may change based on potential interests of the user. In the example embodiment, some attributes have an indicated user preference, such as beds, which have a user preference of 3. Other attributes do not have a user preference. For example, there is no user preference listed for square footage. The system may determine user preferences based on a selected item, based on user preference history of houses the user has indicated as a favorite or as disliked, based on preferences directly indicated by the user such as through as survey, or by other means. FIG. 9 also provides additional analysis 915 about the results that are provided based on each constraint. For example, the number of results that are available based on the number of beds selected is shown in chart 920. Analysis about search results may be provided in the form of a bar graph as shown in chart 920, a line graph, as shown in chart 930, or in another manner. For example, the analysis may be summarized in natural language that a client could understand, or a real estate agent could use to describe additional analysis to the buyer.

The search context panel in some embodiments is designed to show the number of additional listings available above and below a set constraint. For example, the search context panel may show the number of additional listings available above and below a particular price range if the buyer is willing to adjust the range. In some embodiments, the system can be configured to surface or display the number of alternative properties available based on modifications to any number of the search facets (beds, bathrooms, feature-specific facets, and/or the like).

The search context panel provides information about potential properties of interest at the margins or outside of a client's stated search parameters in order to assist the agent in rapidly identifying a broader set of potential home candidates for the client. In some embodiments, the search context panel uses a suggestions model to automate and improve the process of detecting properties of interest to provide to a user based on the selected search criteria. In an embodiment, the system is configured to generate or cause a pop-up window to appear, wherein the pop-up window informs the user of the number of other available properties that would be available if the user were willing to modify one or more criteria. For example, the pop-up may recommend changing the value of an attribute from one value to another, changing a price range, or changing other constraints. The system may provide this information using natural language. For example, in FIG. 10, the system has recommended to a user in pop-up 1010 that changing the number of baths will provide "81 more listings that seem promising."

In one embodiment, to determine which search parameters to recommend changing, and how to change them, the system makes changes to each of the search parameters and determines additional properties that would be included based on the new parameters. For example, the new system may attempt to change a parameter by fixed or relative amounts and analyze the results. The results may be analyzed to determine which changes generate the most new properties. The system may then determine which properties to recommend based on the number of new properties in the results and the amount of change to a parameter. In some embodiments, the new properties are scored by the recommendation system according to their recommendation scores based on a selected item and a the preference history of a user. The recommended change to a search parameter may be chosen as the one that provides the most new properties compared to the amount of change, or instead may be chosen as the one that provides the most similar properties to a property of interest to the user compared to the amount of change. In some embodiments, the system may use the combination of the number of new properties and the similarity of the properties.

Figure 11:
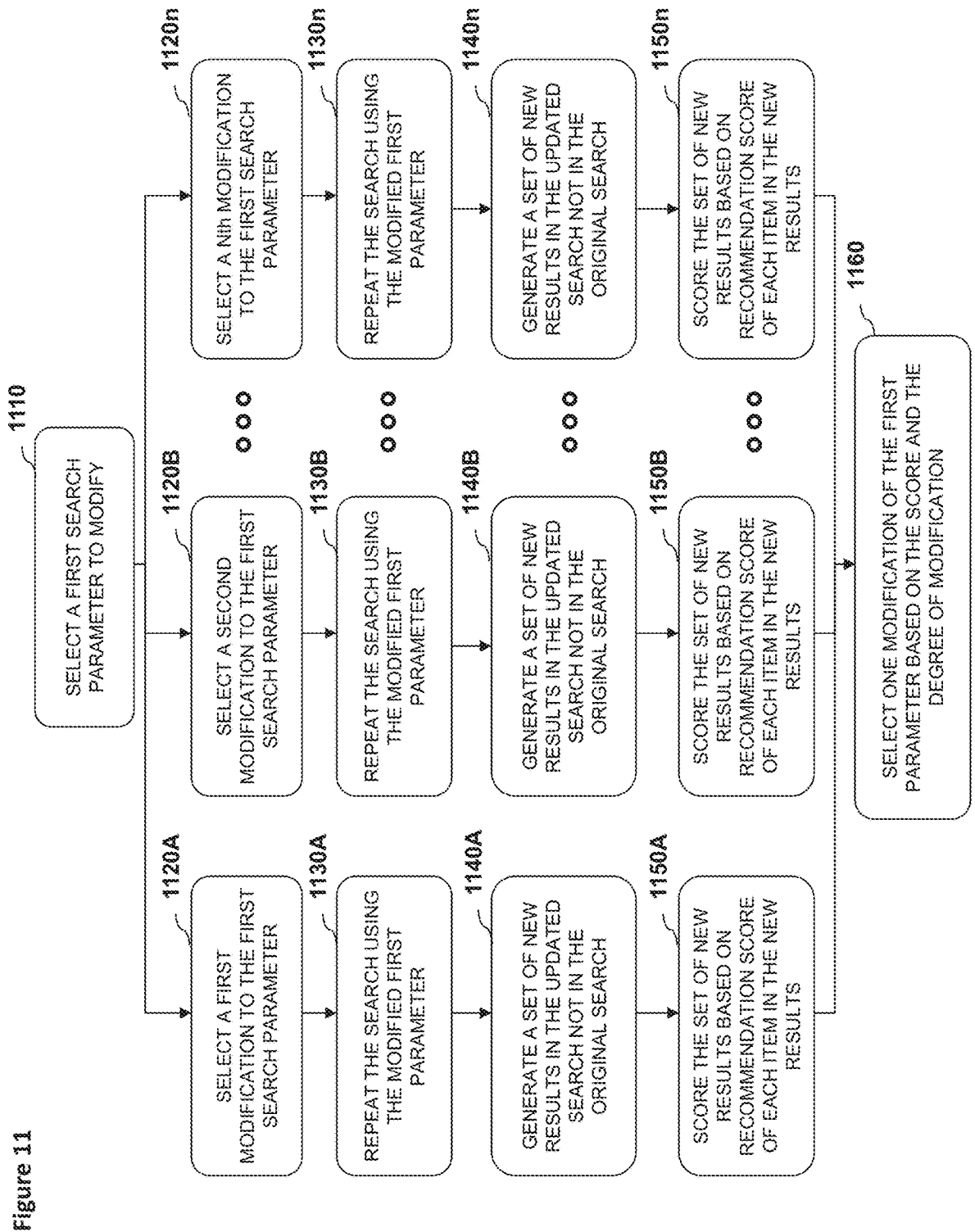
FIG. 11 depicts an embodiment of a process flow diagram illustrating a parameter modification evaluation process.

FIG. 11 is an example flow diagram of determining a recommended parameter modification to a user. The system may start by accepting, receiving, or accessing search parameters from a user. Then the system returns the results to the user sorted based on a calculated likelihood that the consumer will be interested in the property or based on other criteria, such as price or location, for example. After the search is performed, the process flow begins in block 1110 with the selection of a first candidate search parameter to modify. In some embodiments, the recommendation system will repeat the process for all search parameters. The parameter may be selected randomly, selected based on the likelihood that a user would accept a modification to the parameter, selected based on the likelihood of finding additional properties of interest to the user, selected by a combination of factors, or selected in another manner. The system may then select a number of potential modifications to the parameter. FIG. 11 illustrates evaluating three potential modifications to a parameter. In some embodiments, fewer or additional modifications may be evaluated. In blocks 1120A-1120n, the system selects modifications to evaluate for the candidate parameter. In some embodiments the modifications to evaluate may be selected based on the type of parameter to be evaluated. For example, some parameters may be continuous, some may be discrete, and others may be Boolean. Modifications to a continuous parameter may be selected to increase or decrease a parameter by a set percentage, such as 1%, 2%, 3%, 5%, 10%, 15%, 20%, or more. For example, if a user sets a price range, the system may evaluate the a modification to the maximum limit of the price range of 1%, 2%, 3%, 5%, 10%, 15%, and 20%. On the other hand, for a discrete parameter such as bedrooms, modifying a parameter by a percentage doesn't make sense. The system may evaluate changes to a discrete parameter by set value changes. For example, if a user set a constraint of 3 bedroom, the system may evaluate properties with 1, 2, 4, and 5 bedrooms as possible parameter modifications. For a Boolean parameter, the system may evaluate the properties that do not meet the constraint. For example, if a user selected having a pool as a parameter, the system may evaluate those properties not having a pool to determine whether to recommend modifying the parameter.

In blocks 1130A-1130n, the system repeats the search using the modified parameters. For each potential modification, the system may generate a set of that are included in an updated search using the modified parameter. In blocks 1140A-1140n, the system determines a set of new results for each parameter modification. The set of new results includes results that are part of the results in the updated search that were not part of the results in the original search before the modification.

In blocks 1150A-1150n, the system scores each set of new results based on the recommendation score of each item in the new set. The system may score each of the listings in the new set of results according to the processes described in reference to FIGS. 3-6. For example, each listing in the new results may receive a dissimilarity score with reference to a selected item of interest and a user preference score based on the users preference history and/or demographic information. These may be combined into a recommendation score for the property as discussed above. In blocks 1150A-1150n, the system then aggregates the recommendation scores to generate a parameter modification score for each candidate modification the set of new properties. In some embodiments, the parameter modification scores may be based on the total recommendation score, the average recommendation score, a combination of the recommendation score and the number of items in the new set, or another manner using the recommendation scores of each item.

In block 1160, the system determines which parameter modification to recommend to the user. In addition to the modification score, the system may determine which parameter modification to recommend based on other factors. For example the system may weigh the modification scores against the degree of change to a parameter and the total number of properties. For example, the system may favor a first modification with a lower similarity score than a second modification if the first modification is only a 5% change and the second modification is a 25% change. The system then recommends the parameter modification to the user. In some embodiments, the system may determine a modification recommendation for change each parameter, in which case the processes discussed above and shown in FIG. 11 may be repeated for each search parameter.

Figure 12:
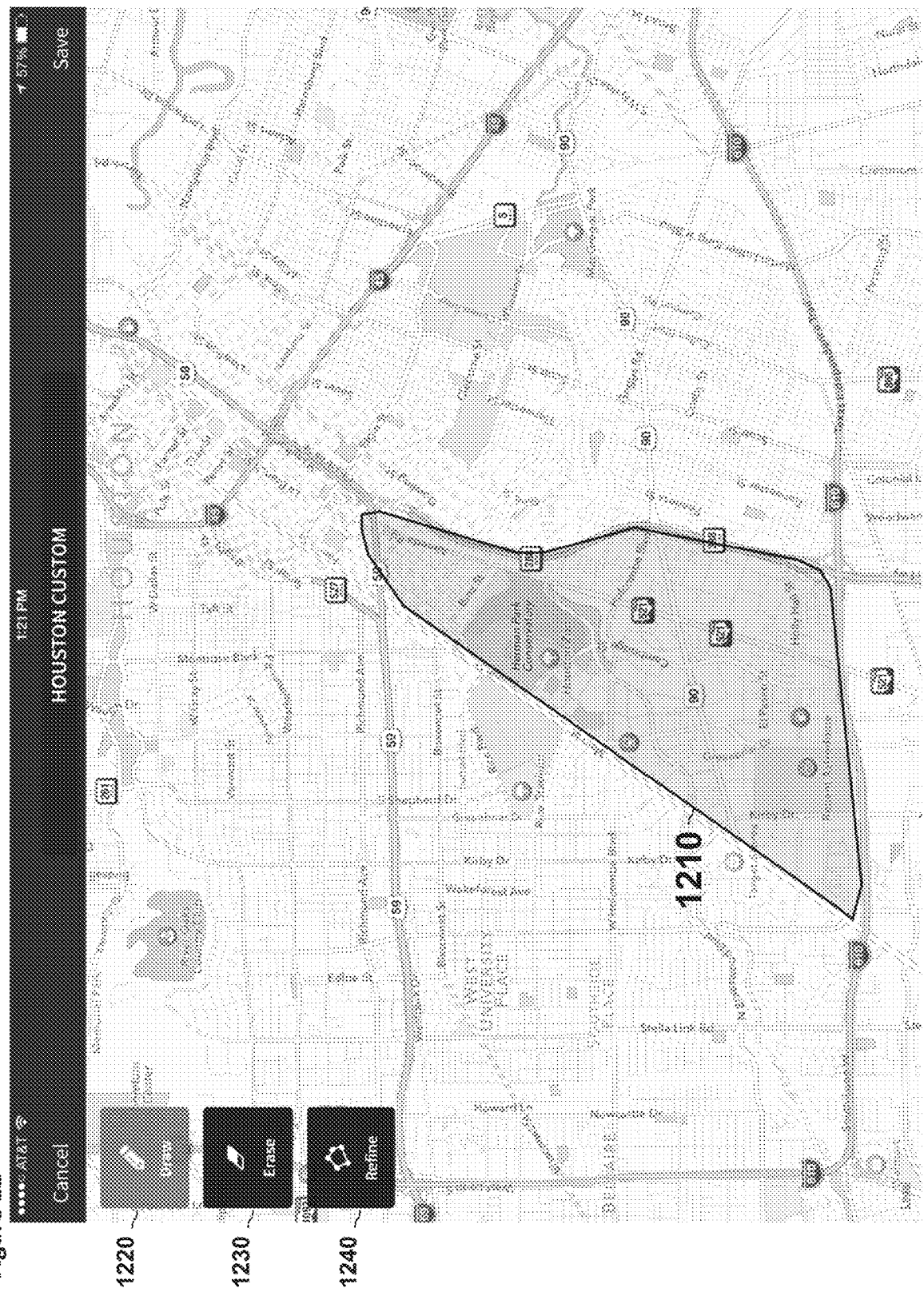
FIG. 12 depicts an embodiment of a user interface of a user access point system enabling a user to generate a custom geographic region.

Custom Geographic Regions:

FIG. 12 illustrates an embodiment of a user access point system configured to enable a user to generate a custom geographic region to use as a constraint for search results. For example, in FIG. 12, the user has drawn region 1210. The user may be provided with drawings tools 1220, 1230, and 1240 to generate the geographic region. In the embodiment of FIG. 12, the user is provided with a draw tool 1220, an erase tool 1230, and a refine tool 1240. In some embodiments fewer or additional tools may be provided to the user.

In some embodiments, the system may assist the user in generating the boundaries of the region. For example, the system may snap boundaries defined by the user to regional landmarks. For example, the user may draw a boundary near a road, and the system may recognize the proximity and snap the boundary set by the user to the road. For example, in FIG. 12, one boundary of the region defined by the user is snapped to Main St. The system may also enable the user to set a geographic region based on set areas such as neighborhoods, school districts, or other local geographic regions. In some embodiments, the recommendation system may generate a geographic region automatically for the user based on the locations of listings returned in a search. For example, the recommendation system may generate a geographic region using the location of properties as nodes indicating the boundary of the region. In other embodiments, the recommendation system may generate a geographic region in other manners based on the location of the listings of interest to the user.

After a geographic region is set, the user may be able to further refine the region. For example, the user may be able to combine two regions to create a second region. For example a user may set one geographic region by placing nodes to establish the boundaries of the area. The user may also want to define a region based on proximity to a landmark. The system may enable a user to create a geographic region that is the intersection of the drawn boundary and the area within a specified proximity to the landmark. In some embodiments, the system may enable the user to combine any number regions to create a searchable region. The user may also be able to cut out portions of the region that the user does not want to search.

Although various embodiments described herein are described with reference to real estate, the concepts described herein may be utilized to determine and present user-specific significant attributes for a variety of unique items. For example, the concepts described herein may be used in relation to existing homes, commercial real estate, vehicles, household goods, collectibles, and/or various other types of unique products or items offered for sale.

Figure 13:
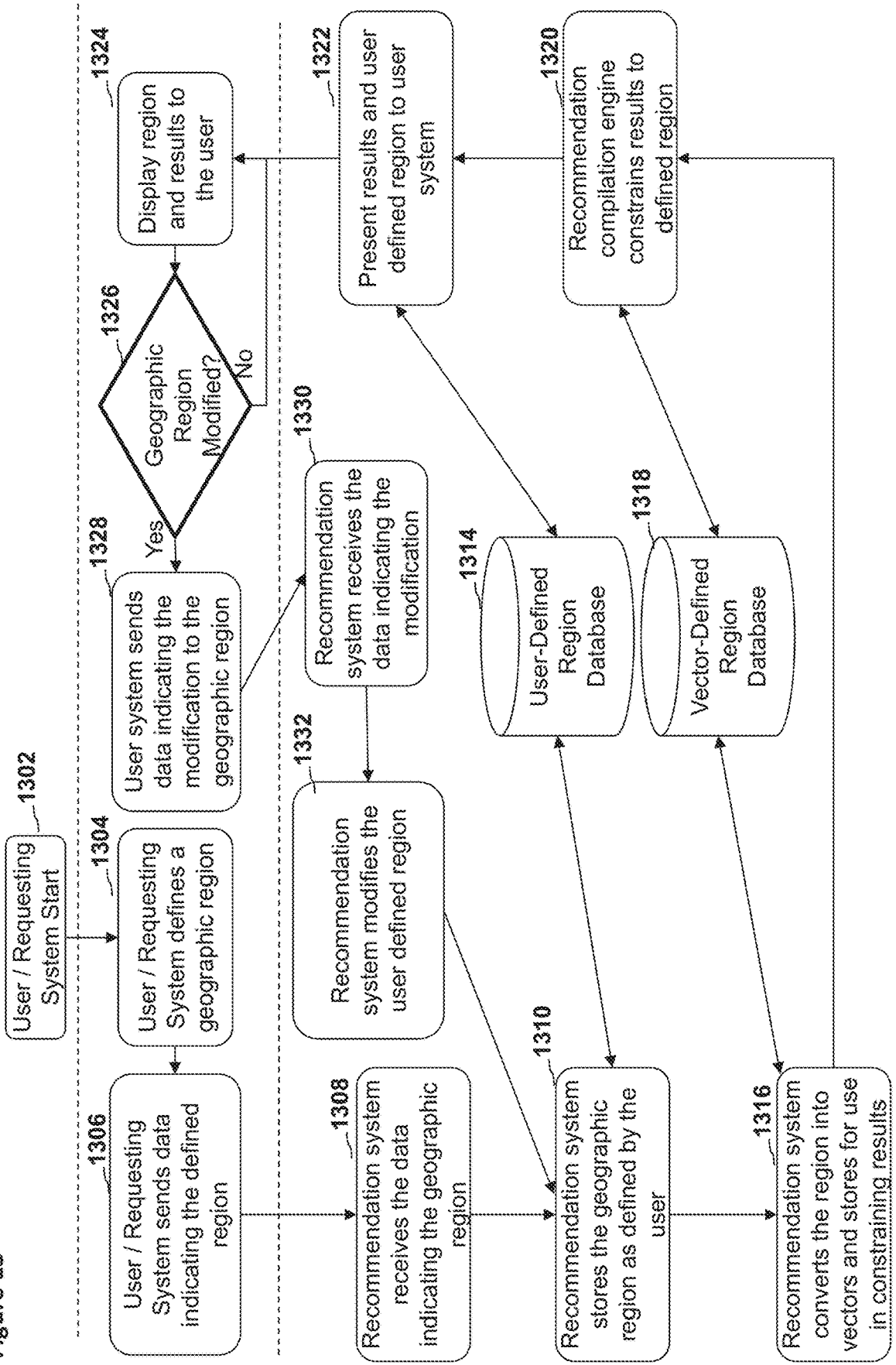
FIG. 13 depicts an embodiment of a process flow diagram illustrating a geographic based search process.

FIG. 13 depicts one example of a process flow for enabling user to generate and update custom geographic regions. The process begins at block 1302. At block 1304, a user or requesting system defines a geographic region. For example, the user access point system 100 illustrated in FIG. 2 may enable a user to define a region on a map. The region may be defined in any way as described above. At block 1306, the user or requesting system sends data indicating the user defined geographic region to the recommendation system. For example, the user access point system 100 may be configured to send information describing the user defined region through the network 204 to the recommendation system 202.

At block 1308, the recommendation system receives the data indicating the user defined region from the user or requesting system. In block 1310 the user defined geographic region is stored in a user defined region database 1314. The region may be stored in the manner the user set the region. For example, if the region was set by placing nodes at boundaries, the user defined region may be stored in the recommendation system as the set of nodes set by the user. In block 1316, the recommendation system converts the user defined region into a vector definition of the system. For example, the contours of the region may be defined in the same manner as a vector drawing of the image would be. This definition of the user defined region may be stored in a vector-defined region database 1318. The recommendation may generate the vector-defined definitions to optimize the process of determining recommended items in the user defined geographic area. The recommendation system may maintain a vector definition and a user defined region so that the user can make updates to the region simply and the recommendation can quickly identify properties in the user defined region.

In block 1320 the recommendation system constrains recommended items to present to the user to those in the user defined region. The recommendation system may access the vector-defined region database 1318 to access the vector-defined definition of the associated user defined region. The recommendation system then limits the recommended alternative properties to those in the region. For example, the recommendation compilation engine 280 may limit the recommended alternatives to present to the user through user access point system 100 to those in the selected geographic region. In some embodiments, the alternative item description receiver 232 may only receive those alternative properties in the selected geographic region. In block 1322.

At block 1322, the recommendation compilation engine presents the recommendations on a map. The recommendation may present the recommendations using the user defined region format such that the user may see and modify the region in the same manner that the region was generated. For example, the recommendation compilation engine 280 can be configured to communicate with the user access point system 100 through the network 204 to present the recommendation to the user access point system 100. At block 1324, the user or requesting system receives the presentation and displays the results to the user. For example, the user access point system 100 illustrated in FIG. 2 may be configured to display using the display interface 208 the recommendation to a user as illustrated in FIG. 1.

In block 1326, the recommendation system determines if the user has made an update to the user defined geographic region. If no update has been made, then the system does nothing and continues to display recommendations. If a modification has been made, the process moves to block 1328 and the user or requesting system sends data indicating the user defined geographic region to the recommendation system. For example, the user access point system 100 may be configured to send information describing the user defined region through the network 204 to the recommendation system 202. At block 1332 the recommendation system modifies the user defined region in the system. For example, the recommendation system can use Boolean logic to accept the modified user defined region. In some embodiments, the user may make a modification by combining a first user defined region with a second user defined region. The regions may be combined at block 1332, or may be stored separately in the recommendation system. Storing the regions separately may enable the system to combine the regions efficiently as a constraint when generating vector-defined regions. In some embodiments, the user-defined region may be combines to form one region in the user-definition database 1314, but the same region may be stored as two separate vector defined regions in the vector-definition database 1318. In addition to combining two regions generated by a user, the recommendation system may enable a user to use other Boolean operations, such as, selecting a region to not include properties from. These regions may also be stored as vector defined regions and operated on in the same way as a constraint for the recommendation system. After generating the new user defined region, the recommendation system continues to block 1310 and repeats the process of recommending properties to the user.

Computing System

Figure 14:
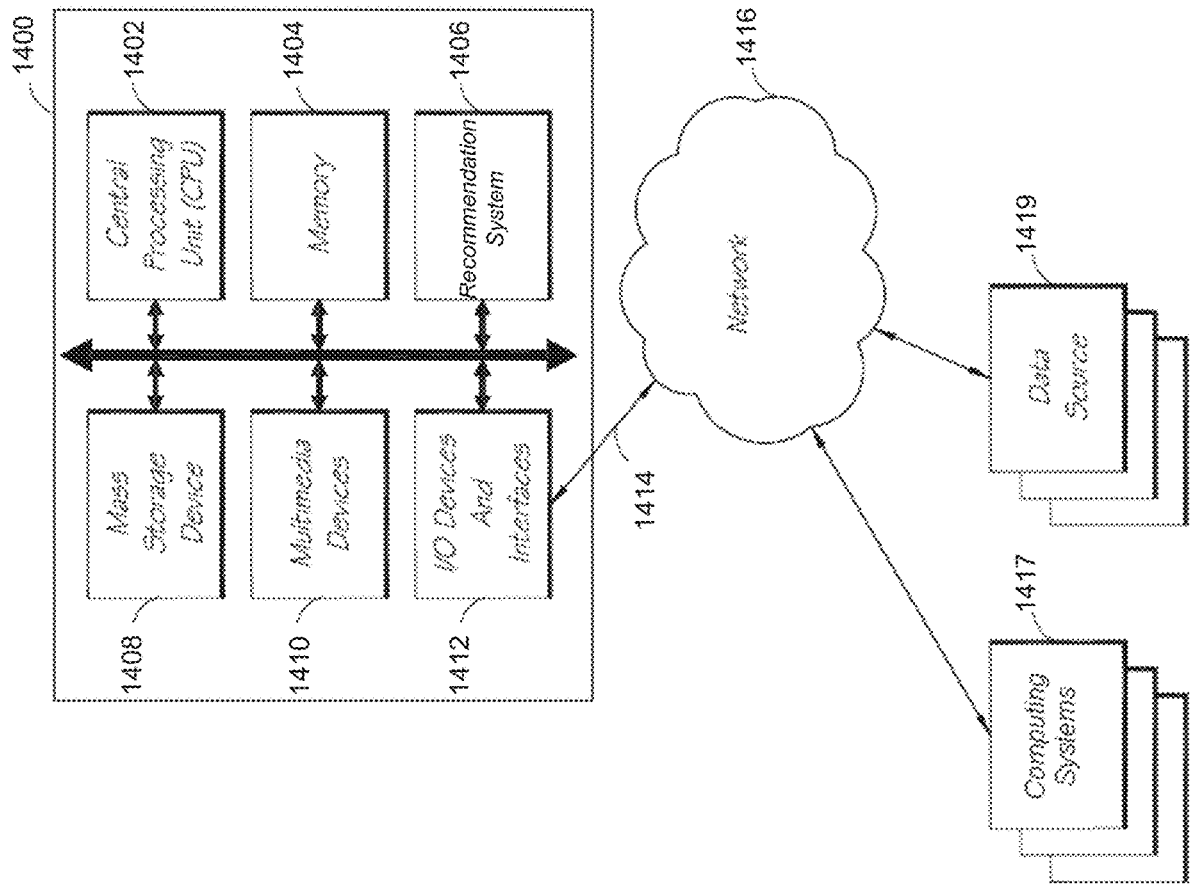
FIG. 14 is a block diagram depicting an embodiment of a computer hardware system configured to run software for implementing one or more embodiments of the systems described herein.

FIG. 14 is a block diagram depicting an embodiment of a computer hardware system configured to run software for implementing one or more embodiments of the recommendation systems described herein.

In some embodiments, the computer clients and/or servers described above take the form of a computing system 1400 illustrated in FIG. 14, which is a block diagram of one embodiment of a computing system that is in communication with one or more computing systems 1417 and/or one or more data sources 1419 via one or more networks 1416. The computing system 1400 may be used to implement one or more of the systems and methods described herein. In addition, in one embodiment, the computing system 1400 may be configured to manage access or administer a software application. While FIG. 14 illustrates one embodiment of a computing system 1400, it is recognized that the functionality provided for in the components and modules of computing system 1400 may be combined into fewer components and modules or further separated into additional components and modules.

Recommendation System Module

In one embodiment, the computing system 1400 comprises a recommendation system module 1406 that carries out the functions described herein with reference to generating recommendations of unique items, including any one of the recommendation techniques described above. In some embodiments, the computing system 1400 additionally comprises a data collection engine, a model building engine, a scoring engine, recommendation compilation engine, dissimilarity penalty calculator, listing system interface, pairing generator, feature calculator, user specific score calculator, selected item description receiver, alternative item description receiver, user access point system module, item selection receiver, and/or display interface that carries out the functions described herein with reference to generating recommendations of unique items. The recommendation system module 1406 and/or other modules may be executed on the computing system 1400 by a central processing unit 1402 discussed further below.

In general, the word "module," as used herein, refers to logic embodied in hardware or firmware, or to a collection of software instructions, possibly having entry and exit points, written in a programming language, such as, for example, COBOL, CICS, Java, Lua, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules described herein are preferably implemented as software modules, but may be represented in hardware or firmware. Generally, the modules described herein refer to logical modules that may be combined with other modules or divided into submodules despite their physical organization or storage.

Computing System Components

In one embodiment, the computing system 1400 also comprises a mainframe computer suitable for controlling and/or communicating with large databases, performing high volume transaction processing, and generating reports from large databases. The computing system 1400 also comprises a central processing unit ("CPU") 1402, which may comprise a conventional microprocessor. The computing system 1400 further comprises a memory 1404, such as random access memory ("RAM") for temporary storage of information and/or a read only memory ("ROM") for permanent storage of information, and a mass storage device 1408, such as a hard drive, diskette, or optical media storage device. Typically, the modules of the computing system 1400 are connected to the computer using a standards based bus system. In different embodiments, the standards based bus system could be Peripheral Component Interconnect (PCI), Microchannel, SCSI, Industrial Standard Architecture (ISA) and Extended ISA (EISA) architectures, for example.

The computing system 1400 comprises one or more commonly available input/output (I/O) devices and interfaces 1412, such as a keyboard, mouse, touchpad, and printer. In one embodiment, the I/O devices and interfaces 1412 comprise one or more display devices, such as a monitor, that allows the visual presentation of data to a user. More particularly, a display device provides for the presentation of GUIs, application software data, and multimedia presentations, for example. In one or more embodiments, the I/O devices and interfaces 1412 comprise a microphone and/or motion sensor that allow a user to generate input to the computing system 1400 using sounds, voice, motion, gestures, or the like. In the embodiment of FIG. 14, the I/O devices and interfaces 1412 also provide a communications interface to various external devices. The computing system 1400 may also comprise one or more multimedia devices 1410, such as speakers, video cards, graphics accelerators, and microphones, for example.

Computing System Device/Operating System

The computing system 1400 may run on a variety of computing devices, such as, for example, a server, a Windows server, a Structure Query Language server, a Unix server, a personal computer, a mainframe computer, a laptop computer, a tablet computer, a cell phone, a smartphone, a personal digital assistant, a kiosk, an audio player, an e-reader device, and so forth. The computing system 1400 is generally controlled and coordinated by operating system software, such as z/OS, Windows 95, Windows 98, Windows NT, Windows 2000, Windows XP, Windows Vista, Windows 7, Windows 8, Linux, BSD, SunOS, Solaris, Android, iOS, BlackBerry OS, or other compatible operating systems. In Macintosh systems, the operating system may be any available operating system, such as MAC OS X. In other embodiments, the computing system 1100 may be controlled by a proprietary operating system. Conventional operating systems control and schedule computer processes for execution, perform memory management, provide file system, networking, and I/O services, and provide a user interface, such as a graphical user interface ("GUI"), among other things.

Network

In the embodiment of FIG. 14, the computing system 1400 is coupled to a network 1416, such as a LAN, WAN, or the Internet, for example, via a wired, wireless, or combination of wired and wireless, communication link 1414. The network 1416 communicates with various computing devices and/or other electronic devices via wired or wireless communication links. In the embodiment of FIG. 14, the network 1416 is communicating with one or more computing systems 1417 and/or one or more data sources 1419.

Access to the recommendation system module 1406 of the computer system 1400 by computing systems 1417 and/or by data sources 1419 may be through a web-enabled user access point such as the computing systems' 1417 or data source's 1419 personal computer, cellular phone, smartphone, laptop, tablet computer, e-reader device, audio player, or other device capable of connecting to the network 1416. Such a device may have a browser module that is implemented as a module that uses text, graphics, audio, video, and other media to present data and to allow interaction with data via the network 1416.

The browser module may be implemented as a combination of an all points addressable display such as a cathode-ray tube (CRT), a liquid crystal display (LCD), a plasma display, or other types and/or combinations of displays. In addition, the browser module may be implemented to communicate with input devices 1412 and may also comprise software with the appropriate interfaces which allow a user to access data through the use of stylized screen elements such as, for example, menus, windows, dialog boxes, toolbars, and controls (for example, radio buttons, check boxes, sliding scales, and so forth). Furthermore, the browser module may communicate with a set of input and output devices to receive signals from the user.

The input device(s) may comprise a keyboard, roller ball, pen and stylus, mouse, trackball, voice recognition system, or pre-designated switches or buttons. The output device(s) may comprise a speaker, a display screen, a printer, or a voice synthesizer. In addition a touch screen may act as a hybrid input/output device. In another embodiment, a user may interact with the system more directly such as through a system terminal connected to the score generator without communications over the Internet, a WAN, or LAN, or similar network.

In some embodiments, the system 1400 may comprise a physical or logical connection established between a remote microprocessor and a mainframe host computer for the express purpose of uploading, downloading, or viewing interactive data and databases on-line in real time. The remote microprocessor may be operated by an entity operating the computer system 1400, including the client server systems or the main server system, an/or may be operated by one or more of the data sources 1419 and/or one or more of the computing systems 1417. In some embodiments, terminal emulation software may be used on the microprocessor for participating in the micro-mainframe link.

In some embodiments, computing systems 1417 who are internal to an entity operating the computer system 1400 may access the recommendation system module 1406 internally as an application or process run by the CPU 1402.

User Access Point

In an embodiment, a user access point or user interface comprises a personal computer, a laptop computer, a tablet computer, an e-reader device, a cellular phone, a smartphone, a GPS system, a Blackberry® device, a portable computing device, a server, a computer workstation, a local area network of individual computers, an interactive kiosk, a personal digital assistant, an interactive wireless communications device, a handheld computer, an embedded computing device, an audio player, or the like.

Other Systems

In addition to the systems that are illustrated in FIG. 14, the network 1416 may communicate with other data sources or other computing devices. The computing system 1400 may also comprise one or more internal and/or external data sources. In some embodiments, one or more of the data repositories and the data sources may be implemented using a relational database, such as DB2, Sybase, Oracle, CodeBase and Microsoft® SQL Server as well as other types of databases such as, for example, a flat file database, an entity-relationship database, and object-oriented database, and/or a record-based database.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment. The headings used herein are for the convenience of the reader only and are not meant to limit the scope of the inventions or claims.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. Additionally, the skilled artisan will recognize that any of the above-described methods can be carried out using any appropriate apparatus. Further, the disclosure herein of any particular feature, aspect, method, property, characteristic, quality, attribute, element, or the like in connection with an embodiment can be used in all other embodiments set forth herein. For all of the embodiments described herein the steps of the methods need not be performed sequentially. Thus, it is intended that the scope of the present invention herein disclosed should not be limited by the particular disclosed embodiments described above.

What is claimed is:

1. A computer-implemented method for generating user specific recommendations of unique items, the computer-implemented method comprising:

monitoring, by a computer system over a computer network, a plurality of user devices to detect interactions by a user with unique item listings presented by at least one electronic listing system, wherein the unique item listings are associated with unique items each comprising a plurality of features including at least a condition and a location;

generating, by the computer system, a user specific scoring model using historical user preference data derived from the monitoring;

identifying, by the computer system, a selected unique item selected by the user, wherein the selected unique item comprises a unique item presented by the at least one electronic listing system, the selected unique item comprising a plurality of features including at least a condition and a location;

determining, by the computer system, differences between the plurality of features of the selected unique item and a plurality of features of each of a plurality of alternative unique items;

generating, by the computer system, a recommendation score for each of the plurality of alternative unique items, wherein the recommendation score indicates a predicted level of preference by the user;

wherein generating the recommendation score comprises applying, by the computer system, the user specific scoring model to the determined differences;

generating, by the computer system, a list of recommended alternative unique items that are predicted to be preferred by the user, wherein the list comprises at least a portion of the plurality of alternative unique items sorted by their respective recommendation scores;

rendering an interactive electronic interface of the at least one electronic listing system, wherein the interactive electronic interface presents the unique item listings and enables the user to search for and interact with the unique item listings;

detecting additional interactions by the user with unique item listings presented by the rendered interactive electronic interface;

regenerating, by the computer system, the user specific scoring model based at least partially on updated historical user preference data that takes into account the additional interactions;

regenerating, by the computer system, recommendation scores for at least a portion of the plurality of alternative unique items, using the regenerated user specific scoring model; and responsive to the regenerating of recommendation scores, re-rendering the interactive electronic interface to present at least a subset of the plurality of alternative unique items sorted by the regenerated recommendation scores;

wherein the computer system comprises a computer processor and electronic memory.

2. The computer-implemented method of claim 1, wherein the user specific scoring model is configured to enable generation of recommendation scores for alternative unique items that are not included in the historical user preference data derived from the monitoring.

3. The computer-implemented method of claim 1, further comprising:

identifying, by the computer system, based on the monitored interactions, a preferred unique item, wherein the preferred unique item is an item presented by the at least one electronic listing system which the user has interacted with in a manner indicating the user prefers the preferred unique item over at least one other unique item; and updating the historical user preference data with an indication of the preferred unique item.

4. The computer-implemented method of claim 3, further comprising:

updating the user specific scoring model, wherein updating the user specific scoring model comprises:

identifying, by the computer system, a preferred feature of the preferred unique item that is not a feature of the other unique item; and updating the user specific scoring model such that generating a recommendation score will return a higher recommendation score for a unique item having the preferred feature.

5. The computer-implemented method of claim 1, wherein the generating of the user specific scoring model comprises at least:

creating training data comprising a plurality of pairs of unique items that were detected as interacted with by the user, each of the plurality of pairs of unique items comprising difference data indicative of differences between a plurality of features including at least a condition and a location;

labeling each of the plurality of pairs with a preference indicator associated with one of the unique items of each pair; and inputting the training data into a supervised learning algorithm to generate a function that can output a predicted relative level of preference for an alternative unique item based on differences between condition and location features of the alternative unique item and a selected unique item.

6. The computer-implemented method of claim 1, wherein the computer system comprises the at least one electronic listing system.

7. A computer readable, non-transitory storage medium having a computer program stored thereon for causing a suitably programmed computer system to process by one or more processors computer-program code by performing a method for generating user specific recommendations of unique items when the computer program is executed on the suitably programmed computer system, the method comprising:

monitoring, by a computer system over a computer network, a plurality of user devices to detect interactions by a user with unique item listings presented by at least one electronic listing system, wherein the unique item listings are associated with unique items each comprising a plurality of features including at least a condition and a location;

generating, by the computer system, a user specific scoring model using historical user preference data derived from the monitoring;

identifying, by the computer system, a selected unique item selected by the user, wherein the selected unique item comprises a unique item presented by the at least one electronic listing system, the selected unique item comprising a plurality of features including at least a condition and a location;

determining, by the computer system, differences between the plurality of features of the selected unique item and a plurality of features of each of a plurality of alternative unique items;

generating, by the computer system, a recommendation score for each of the plurality of alternative unique items, wherein the recommendation score indicates a predicted level of preference by the user;

wherein generating the recommendation score comprises applying, by the computer system, the user specific scoring model to the determined differences;

generating, by the computer system, a list of recommended alternative unique items that are predicted to be preferred by the user, wherein the list comprises at least a portion of the plurality of alternative unique items sorted by their respective recommendation scores;

rendering an interactive electronic interface of the at least one electronic listing system, wherein the interactive electronic interface presents the unique item listings and enables the user to search for and interact with the unique item listings;

detecting additional interactions by the user with unique item listings presented by the rendered interactive electronic interface;

regenerating, by the computer system, the user specific scoring model based at least partially on updated historical user preference data that takes into account the additional interactions;

regenerating, by the computer system, recommendation scores for at least a portion of the plurality of alternative unique items, using the regenerated user specific scoring model; and responsive to the regenerating of recommendation scores, re-rendering the interactive electronic interface to present at least a subset of the plurality of alternative unique items sorted by the regenerated recommendation scores;

wherein the computer system comprises a computer processor and electronic memory.

8. The computer readable, non-transitory storage medium of claim 7, wherein the user specific scoring model is configured to enable generation of recommendation scores for alternative unique items that are not included in the historical user preference data derived from the monitoring.

9. The computer readable, non-transitory storage medium of claim 7, the method further comprising:

identifying, by the computer system, based on the monitored interactions, a preferred unique item, wherein the preferred unique item is an item presented by the at least one electronic listing system which the user has interacted with in a manner indicating the user prefers the preferred unique item over at least one other unique item; and updating the historical user preference data with an indication of the preferred unique item.

10. The computer readable, non-transitory storage medium of claim 9, the method further comprising:

updating the user specific scoring model, wherein updating the user specific scoring model comprises:

identifying, by the computer system, a preferred feature of the preferred unique item that is not a feature of the other unique item; and updating the user specific scoring model such that generating a recommendation score will return a higher recommendation score for a unique item having the preferred feature.

11. The computer readable, non-transitory storage medium of claim 7, wherein the generating of the user specific scoring model comprises at least:

creating training data comprising a plurality of pairs of unique items that were detected as interacted with by the user, each of the plurality of pairs of unique items comprising difference data indicative of differences between a plurality of features including at least a condition and a location;

labeling each of the plurality of pairs with a preference indicator associated with one of the unique items of each pair; and inputting the training data into a supervised learning algorithm to generate a function that can output a predicted relative level of preference for an alternative unique item based on differences between condition and location features of the alternative unique item and a selected unique item.

12. The computer readable, non-transitory storage medium of claim 7, wherein the computer system comprises the at least one electronic listing system.

* * * * *